United States Patent
Doumoto et al.

(10) Patent No.: US 7,460,706 B2
(45) Date of Patent: Dec. 2, 2008

(54) METHOD OF RECOGNIZING COLOR BARS ON DOUBLE-SIDED COLOR PRINTS, COLOR PRINT QUALITY CONTROL SYSTEM AND COLOR PRINT QUALITY EVALUATION APPARATUS

(75) Inventors: Hideki Doumoto, Fuchu (JP); Takashi Kimura, Fuchu (JP)

(73) Assignee: Ryobi Ltd., Hiroshima-Ken (JP)

( * ) Notice: Subject to any disclaimer, the term of this patent is extended or adjusted under 35 U.S.C. 154(b) by 932 days.

(21) Appl. No.: 10/881,412

(22) Filed: Jun. 29, 2004

(65) Prior Publication Data

US 2004/0264773 A1    Dec. 30, 2004

(30) Foreign Application Priority Data

Jun. 30, 2003    (JP) ............................. 2003-187203

(51) Int. Cl.
*G06K 9/00* (2006.01)
*B41F 31/02* (2006.01)

(52) U.S. Cl. ..................... 382/167; 382/112; 382/141; 101/365

(58) Field of Classification Search ................. 382/112, 382/141–143, 163–167; 358/500, 501, 510; 101/365, 484
See application file for complete search history.

(56) References Cited

U.S. PATENT DOCUMENTS

| | | | |
|---|---|---|---|
| 4,637,728 A | | 1/1987 | Kipphan et al. |
| 5,724,437 A | * | 3/1998 | Bucher et al. ................ 382/112 |
| 6,192,801 B1 | * | 2/2001 | Papritz et al. ................ 101/484 |
| 6,446,555 B1 | * | 9/2002 | Schramm et al. ............ 101/365 |

FOREIGN PATENT DOCUMENTS

| | | |
|---|---|---|
| DE | 43 21 177 A1 | 1/1995 |
| DE | 299 16 379 U1 | 1/2000 |
| JP | SHO-58-90124 | 5/1983 |
| JP | 2001088273 A | 9/2000 |

OTHER PUBLICATIONS

Office Action dated Jun. 20, 2006, from German Patent Office, with English translation.

* cited by examiner

*Primary Examiner*—Duy M Dang
(74) *Attorney, Agent, or Firm*—TIPS Group

(57) ABSTRACT

In a double-sided color printing press, first and second color bars of a print are scanned to acquire alignment information of control patches, so that the first and second color bars are recognized whether they are printed on the first or second side of the print based on the alignment information. The alignment information of the patches acquired is compared with alignment information previously stored in a memory means so that when they are matched, information on the print quality of the patches evaluated is transmitted to the printing press in the order in which they are scanned in scanning directions, and when they are not matched, the information is transmitted to the printing press in the reversed scanning order. The amount of ink is thus controlled based on the information on the print quality in the order in which they are transmitted.

7 Claims, 11 Drawing Sheets

METHOD OF RECOGNIZING COLOR BARS ON DOUBLE-SIDED COLOR PRINTS, COLOR PRINT QUALITY CONTROL SYSTEM AND COLOR PRINT QUALITY EVALUATION APPARATUS

CROSS REFERENCE TO RELATED APPLICATION

This application claims priority from Japanese Patent Application No. 2003-187203, which is incorporated herein by reference.

BACKGROUND OF THE INVENTION

1. Field of the Invention

The present invention relates to a method of recognizing color bars on double-sided color prints, a color print quality control system and a color print quality evaluation apparatus.

2. Related Art

A single-sided color print with its single side printed in color is produced by printing a color print image on a single side of a substrate with using plural basic different colors such as cyan (C), magenta (M), yellow (Y) and black (Bk). A double-sided color print with its both sides printed in color is produced by additionally printing a color print image on another side of the substrate in the same manner as in the single-sided color printing.

In either case, whether the single-sided color printing or the double-sided color printing is carried out, a color print image printed on each substrate is subjected to print quality control (e.g., color matching) in order to keep an appropriate quality color print image.

In more detail, according to the print quality control operation (e.g., color matching) for color print images of a color print printed by a single-sided color printing press and a double-sided color printing press, when printing a color print image, a color bar comprised of control patch groups each comprised of plural control patches of plural colors aligned in a given direction, which colors corresponding to basic colors of the color print image, is printed in a certain region or generally a margin of the print where no color print image is printed so as to provide for print quality evaluation. The color bar thus printed is scanned by a color print quality evaluation apparatus (e.g., an apparatus equipped with densitometer and spectrophotometer) so as to detect the print quality (e.g., density) of the control patches of each patch group in the color bar. The print quality control operation in each printing press is thus controlled based on the detected value and its reference value fed back to the printing press. Once receiving the fed back values, each color printing press adjusts the amounts of inks set by ink fountains each including ink fountain keys mounted respectively corresponding to the control patch groups, based on the information representative of the print quality (hereinafter referred simply to print quality information) of the patches in each patch group.

In the above quality control operation, while the feeding back of only the print quality information of a color print image of the single side of a substrate is enough for the single-sided color printing, it is necessary in the double-sided color printing to make the double-sided color printing press recognize that a detected or evaluated color bar is the one printed on a first or second side of the substrate before feeding back of the print quality information.

In the print quality control operation hitherto made for a color print image on each side of a print, an operator needs to check whether an evaluated color bar is the one printed on a first or second side of a double-sided color print every time the evaluation of the print quality is performed based on the control patches of the color bar scanned by a color print quality evaluation apparatus, and send or set this information to the printing press, thus allowing the printing operation of the printing press to be controlled based on the information fed back thereto. In summary, this conventional print quality control operation requires the operator to check whether an evaluated color bar is the one printed on a first or second side of a double-sided color print and send or set this information to the printing press every time the scanning and evaluation are made. This quality checking increases the workload of the operator and hence increases the possibility to cause him to send or set incorrect information to the printing press. Accordingly, the correct print quality information may not be securely fed back to the printing press, making prints unusable as products or causing a lot of time for correction of the feed-back information to the printing press.

In order to address the above problem, a print quality control method as proposed in Japanese Patent Application Laid-open No. Sho-58-214822 employs a double-sided color print with the control patches of a color bar respectively corresponding to plural basic different colors of a color print image, some of them being printed on the first side of the print while the residual being printed on the second side of the print. According to this method, of the control patches of the color bar respectively corresponding to the plural basic colors of the color print image, the patches on the first side and the patches on the second sides of the print are printed respectively in different orientations so as to allow the color print quality evaluation apparatus to detect whether the evaluated control patches are those printed on the first or second side of the print.

In the above method, where the control patches of the color bar printed on the first and second sides of a print in different orientations are respectively printed by different printing sections, the print quality for all the basic colors of the color print images respective printed on the first and second sides of the double-sided color print is hard to be controlled.

Another problem arises when the above method is carried out by a conventional print quality control system, the detailed description of which will be made hereinafter.

For achieving the print quality control operation by carrying out the above method in a conventional color print quality control system, the system is equipped with a color printing press and a color print quality evaluation apparatus. The color printing press is to print, on at least one of the opposite sides of each substrate transferred in a given transfer direction, a color print image composed of plural basic different colors by, for example, ink fountains of plural basic different colors, each including 1st to Mth (M is an integer of 2 or larger) ink fountain keys respectively aligned crossing substantially at a right angle to the substrate transfer direction, and a color bar for evaluation of each of the plural basic different colors of the color print image, which color bar comprised of 1st to Mth control patches aligned respectively corresponding to the 1st to Mth ink fountain keys. The color print quality evaluation apparatus is to scan the 1st to Mth patches of each color print printed by the printing press in a given scanning direction and evaluate the print quality of each patch. The print quality information of each patch evaluated by the color print quality evaluation apparatus is transmitted to the printing press in the order in which the patches are scanned in the given scanning direction so that the amounts of inks set by the 1st to Mth ink fountain keys of the printing press are respectively adjusted based on the print quality information in the order in which they are transmitted from the color print quality evaluation apparatus.

In the thus arranged color print quality control system, each color bar arranged corresponding in position to the aligned ink fountain keys is printed in an uppermost region (hereinafter referred to a leading end region) or lowermost region (hereinafter referred to a trailing end region) in each substrate in the transfer direction, depending on the type or kind of a print. FIG. 10A illustrates a print Q' with a color bar E printed in the leading end region and FIG. 10B illustrates the print Q' with the color bar E printed in the trailing end region, which color bar being comprised of 1st to Mth patches D aligned in a direction represented by arrow H crossing substantially at a right angle to the substrate transfer direction represented by arrow G.

In a case where the color bar E is printed in the leading end region of the print Q', as illustrated in FIG. 10A, a print image IM of the print Q' is printed upstream to the color bar E in the transfer direction G (an upper part in the Figure). In a case where the color bar E is printed in the trailing end region of the print Q', as illustrated in FIG. 10B, the print image IM is printed downstream to the color bar E in the transfer direction G (a lower part in the Figure). The color bar E thus printed is scanned by a scanning section J of the color print quality evaluation apparatus in a given scanning direction represented by arrow F. When an image capturing part J1 is located in the scanning section J downward in FIG. 10A, the scanning section J is likely to contact the print image IM printed upward in FIG. 10A and hence stain the print image IM just after printed. In order to address this problem associated with the case where the image capturing part J1 is located in the scanning section J downward in the Figure and the print image IM is printed on the print upward to the color bar E in the Figure, or the image capturing part J1 is located in the scanning section J upward in the Figure and the print image IM is printed on the print downward to the color bar E in the Figure, the print is turned 180° horizontally and then scanned, thereby preventing the scanning section J from contacting the print image IM. FIG. 11A illustrates an operational state where the print Q' of FIG. 10A is turned 180° horizontally and then scanned by the scanning section J with the image capturing part J1 located downward in the Figure. FIG. 11B illustrates an operational state where the print Q' of FIG. 10B is scanned by the scanning section J with the image capturing part J1 located downward in the Figure.

The scanning upon turn of the print Q' by 180° can prevent the scanning section J from contacting the print image IM, but pauses another problem. That is, the scanning section J scans the patches D of the turned print in the order from the Mth patch to the 1st patch in the given scanning direction F (see FIG. 11A), and the print quality information is accordingly transmitted in this order. This causes the amounts of inks set by the 1st to Mth ink fountain keys to be adjusted based on the print quality information transmitted in this reversed order as mentioned above, and hence makes it impossible to control the ink fountain keys based on the correct compensation data. In order to address this problem, a so-called 180-degree turn switch is provided to send to the color print quality evaluation apparatus the information that the print Q' has been turned 180°. The operator presses this 180-degree turn switch to send to the evaluation apparatus the information that the print Q' has been turned 180°, thereby allowing the evaluation apparatus to receive the print quality information of the patches D in the order reversed to the order in which the patches are scanned in the given scanning direction F. Thus, the ink fountain keys are adjusted based on the correct compensation data.

According to the above arrangement, the switch must be pressed by the operator to send the information that the print Q' has been turned 180° to the color print quality evaluation apparatus. This makes the operator's print quality control operation troublesome in the same manner as the above-mentioned print quality control operation. Also, this arrangement is disadvantageous in the fact that once the operator has unintentionally skipped to press the switch, the ink fountain keys cannot be controlled based on the correct compensation data.

It is an object of the present invention to provide a method of recognizing color bars on double-sided color prints that is capable of facilitating the print quality control operation by the operator, as well as a color print quality control system and a color print quality evaluation apparatus that carry out this method.

Specifically, it is an object of the present invention to provide a method of recognizing color bars on double-sided color prints that is capable of controlling the print quality such as density for all the basic colors of a color print image on each side of a double-sided color print, facilitating the print quality control operation of a color print image on each side of the double-sided color print, and preventing the operator's misoperation in executing the print quality control so as to limit the occurrence of defective prints, as well as providing a color print quality control system and a color print quality evaluation apparatus that carry out this method.

It is another object of the present invention to provide a color print quality control system that is capable of omitting the necessity to provide such as a 180-degree turn switch in the color print quality evaluation apparatus conventionally required for sending the information that a print has been turned 180°, and hence reducing the workload of the operator to press the switch or the like.

SUMMARY OF THE INVENTION

According to the present invention, there is provided a method of recognizing color bars on double-sided color prints, color print quality control system and color print quality evaluation apparatus as described below.

(1) A Method of Recognizing Color Bars on Double-sided Color Prints

A method of recognizing color bars on a double-sided color print printed by a double-sided color printing press with a first printing section and a second printing section, includes: printing on a first side of a substrate a first color print image composed of plural basic different colors and a first color bar for evaluation of the respective plural basic different colors of the first color print image by the first printing section, the first color bar being comprised of at least one first control patch group aligned in a first alignment direction, each of the at least one first control patch group being comprised of plural control patches of plural colors aligned in the first alignment direction respectively corresponding to the plural basic different colors; printing on a second side of the substrate a second color image composed of the plural basic different colors and a second color bar for evaluation of the respective plural basic different colors of the second color print image by the second printing section, the second color bar being comprised of at least one second control patch group aligned in a second alignment direction different from the first alignment direction, each of the at least one second control patch group being comprised of plural control patches of plural colors aligned in the second alignment direction respectively corresponding to the plural basic different colors; scanning at least one of the at least one first control patch group and the at least one second control patch group in a scanning direction identical to the alignment direction of the patches in the scanned at least one control patch group, thereby acquiring alignment information of the scanned at least one control patch group; and recognizing whether the first and second color bars each have been printed on the first side or second side of the double-sided color print.

(2) A Method of Recognizing Color Bars on Double-sided Color Prints

A double-sided color print quality control system comprises a double-sided color printing press and a color print quality evaluation apparatus. The double-sided color printing press includes: a first printing section that prints on a first side of a substrate a first color print image composed of plural basic different colors and a first color bar for evaluation of the respective plural basic different colors of the first color print image, the first color bar being comprised of at least one first control patch group aligned in a first alignment direction, each of the at least one first control patch group being comprised of plural control patches of plural colors aligned in the first alignment direction respectively corresponding to the plural basic different colors; and a second printing section that prints on a second side of the substrate a second color image composed of the plural basic different colors and a second color bar for evaluation of the respective plural basic different colors of the second color print image, the second color bar being comprised of at least one second control patch group aligned in a second alignment direction different from the first alignment direction, each of the at least one second control patch group being comprised of plural control patches of plural colors aligned in the second alignment direction respectively corresponding to the plural basic different colors. The color print quality evaluation apparatus includes: an evaluation member that scans the at least one first control patch group in a scanning direction identical to the first alignment direction, scans the at least one second control patch group in a scanning direction identical to the second alignment direction, thereby evaluating the print quality of the plural control patches of the at least one first control patch group and evaluating the print quality of the plural control patches of the at least one second control patch group; a detection means for acquiring alignment information of the plural control patches of at least one of the at least one first control patch group and the at least one second control patch group scanned by the evaluation member; and a recognition means for recognizing whether the first and second color bars each have been printed on the first side or second side of the double-sided color print based on the alignment information of the plural control patches acquired by the detection means.

(3) A Color Print Quality Evaluation Apparatus

A color print quality evaluation apparatus is provided for evaluation the print quality of plural control patches printed by a double-sided color printing press that includes a first printing section and a second printing section, in which a first color print image composed of plural basic different colors and a first color bar for evaluation of the respective plural basic different colors of the first color print image are printed by the first printing section on a first side of a substrate, the first color bar being comprised of at least one first control patch group aligned in a first alignment direction, each of the at least one first control patch group being comprised of plural control patches of plural colors aligned in the first alignment direction respectively corresponding to the plural basic different colors, and a second color image composed of the plural basic different colors and a second color bar for evaluation of the respective plural basic different colors of the second color print image are printed by a second printing section on a second side of the substrate, the second color bar being comprised of at least one second control patch group aligned in a second alignment direction different from the first alignment direction, each of the at least one second control patch group being comprised of plural control patches of plural colors aligned in the second alignment direction respectively corresponding to the plural basic different colors. The color print quality evaluation apparatus comprises: an evaluation member that scans the at least one first control patch group in a scanning direction identical to the first alignment direction, scans the at least one second control patch group in a scanning direction identical to the second alignment direction, thereby evaluating the print quality of the plural control patches of the at least one first control patch group and evaluating the print quality of the plural control patches of the at least one second control patch group; a detection means for acquiring alignment information of the plural control patches of at least one of the at least one first control patch group and the at least one second control patch group scanned by the evaluation member; and a recognition means for recognizing whether the first and second color bars each have been printed on the first side or second side of the double-sided color print based on the alignment information of the plural control patches acquired by the detection means.

According to the method of recognizing color bars on double-sided color prints, color print quality control system and color print quality evaluation apparatus, the first control patch group on the first side of a double-sided color print printed by the double-sided color printing press corresponds to all the basic different colors of the first color print image, while the second control patch group on the second side of the double-sided color print corresponds to all the basic different colors of the second color print image. Therefore, it is possible to control the print quality for all the basic different colors of the color print images on the respective sides of the double-sided color print.

With the above method, system and apparatus, on the double-sided color print by the double-sided color printing press with the first color bar printed on the first side, the first color bar comprised of at least one first control patch group aligned in the first alignment direction, each of the at least one first control patch group being comprised of the plural control patches aligned in the first alignment direction, and the second color bar comprised of at least one second control patch group aligned in the second alignment direction different from the first alignment direction, each of the at least one second control patch group being comprised of the plural control patches aligned in the second alignment direction, at least one of the first and second control patch groups is scanned in the scanning direction identical to the alignment direction of the scanned control patches so as to acquire the alignment information of the scanned control patch group, and whether the color bar corresponding to the scanned control patches has been printed on the first or second side of the print is recognized. Thus, it is possible to facilitate the print quality control operation for the color print images on the respective sides of the double-sided color print, while limiting occurrence of the misoperation in execution of the print quality control by the operator and hence limiting occurrence of defective prints.

In the double-sided color print quality control system and the color print quality evaluation apparatus, information recognized by the recognition means of the color print quality evaluation apparatus may be automatically transmitted from the color print quality evaluation apparatus to the double-sided color printing press. Alternatively or additionally, a given display means (e.g., a display means provided in the color print quality evaluation apparatus and/or the double-sided color printing press, or a display means provided separately from them) may be provided to display the aforesaid recognized information thereon, allowing the operator to visually observe the recognized information. The arrangement allowing the information recognized by the recognition means to be automatically transmitted to the double-sided color printing press can omit the necessity to check whether the color bar as detected has been printed on the first or second side of the print, thus limiting occurrence of the misoperation in execution of the print quality control by the operator and hence limiting occurrence of defective prints.

The color print quality evaluation apparatus may include a densitometer and a spectrophotometer. In this case, the density and the like of a color bar can be cited as the print quality of the color bar to be evaluated.

According to the method of recognizing color bars on double-sided color prints, color print quality control system and color print quality evaluation apparatus of the present invention, it is possible to control the print quality (e.g., density) for all the basic different colors of the color print images on the respective sides of the double-sided color print, as well as facilitate the print quality control operation for the color print images on the respective sides of the double-sided color print, while limiting occurrence of the misoperation in execution of the print quality control by the operator and hence limiting occurrence of defective prints.

In the method, system and apparatus of the present invention, the first and second printing sections of the double-sided color printing press may print the first and second color bars so as not to have a common color between at least the Nth (N is an integer of 1 or larger) control patch in the first alignment direction of the at least one first control patch group and at least the Nth control patch in the second alignment direction of the at least one second control patch group.

Where the above printing manner is applied in the method of the present invention, the color of at least one of at least Nth control patch in the first alignment direction of the at least one first control patch group printed on the first side of the substrate and at least Nth control patch in the second alignment direction of the at least one second control patch group printed on the second side of the substrate is previously stored. Then, the color of at least the Nth control patch in the scanning direction of at least one of the first and second patch groups on the substrate with the first and second color bars printed thereon by the first and second printing sections of the double-sided color printing press so as to have the at least Nth control patch of the first control patch group in the first alignment direction different from the at least Nth control patch of the second control patch group in the second alignment direction, thus acquiring the alignment information of the control patches in the detected control patch group. Then, for the recognition of the control patch group, the color of at least the Nth control patch in the scanning direction of the detected control patch group is checked against the color of at least the Nth control patch in the alignment direction of the control patch previously stored, thus allowing the recognition whether the color bar of the detected control patches has been printed on the first or second side of the double-sided color print.

According to the double-sided color print control system of the present invention, the double-sided color printing press prints the first and second color bars at the first and second printing sections so as to have the color of at least the Nth control patch in the first alignment direction of the first control patch group different from the color of at least the Nth control patch in the second alignment direction of the second control patch group. The color print quality evaluation apparatus includes a memory means for previously storing at least one of the color of at least the Nth control patch in the first alignment direction of the first control patch group printed on the first side of the substrate and the color of at least the Nth control patch in the second alignment direction of the second control patch group printed on the second side of the substrate. The evaluation member of the color print quality evaluation apparatus includes a measuring division that is capable of recognizing the colors of the control patches in at least one of the scanned first and second control patch groups. The detection means detects the color of at least the Nth control patch in the scanning direction of at least one of the first and second control patch groups on the double-sided print with the first and second color bars printed thereon at the first and second printing sections of the double-sided color printing press so as to have the color of at least the Nth control patch in the first alignment direction of the first control patch group different from the color of at least the Nth control patch in the second alignment direction of the second control patch group, thus acquiring the alignment information of the control patches in the detected control patch group. The recognition means then checks the color of at least the Nth control patch in the scanning direction of the control patch group detected by the detection means against the color of at least the Nth control patch in the alignment direction of the control patch group previously stored in the memory means, thus allowing itself to recognize whether the color bar of the control patch group detected by the detection means has been printed on the first or second side of the double-sided color print.

According to the color print quality evaluation apparatus of the present invention, it includes a memory means for previously storing at least one of the color of at least the Nth control patch in the first alignment direction of the first control patch group printed on the first side of the substrate and the color of at least the Nth control patch in the second alignment direction of the second control patch group printed on the second side of the substrate. The evaluation member includes a measuring division that is capable of recognizing the colors of the control patches in at least one of the scanned first and second control patch groups. The detection means detects the color of at least the Nth control patch in the scanning direction of at least one of the first and second control patch groups on the double-sided print with the first and second color bars printed thereon at the first and second printing sections of the double-sided color printing press so as to have the color of at least the Nth control patch in the first alignment direction of the first control patch group different from the color of at least the Nth control patch in the second alignment direction of the second control patch group, thus acquiring the alignment information of the control patches in the detected control patch group. The recognition means then checks the color of at least the Nth control patch in the scanning direction of the control patch group detected by the detection means against the color of at least the Nth control patch in the alignment direction of the control patch group previously stored in the memory means, thus allowing itself to recognize whether the color bar of the control patch group detected by the detection means has been printed on the first or second side of the double-sided color print.

According to another aspect of the present invention, there is provided a color print quality control system that includes a color printing press and a color print quality evaluation. The color printing press includes a printing part that prints a color print image composed of plural basic different colors and a color bar for evaluation of the respective plural basic different colors on at least one side of each of substrates transferred in a given transfer direction by an ink fountain for the plural basic different colors, the ink fountain being equipped with 1st to Mth (M is an integer of 2 or larger) ink fountain keys aligned in an alignment direction crossing substantially at right angle to the transfer direction, the color bar being comprised of 1st to Mth control patch groups each comprised of control patches of plural colors aligned in the alignment direction respectively corresponding to the 1st to Mth ink fountain keys, and a print control part that adjusts the amounts of inks set by the 1st to Mth ink fountain keys based on print quality information of the control patches of the 1st to Mth patch groups. The color print quality evaluation apparatus includes a memory means for previously storing alignment information regarding the alignment direction of the plural control patches of the 1st to Mth control patch groups, an evaluation member that scans the 1st to Mth patch groups printed on each of substrates by the color printing press and evaluates the print quality of the control patches of the scanned patch groups, a detection means for acquiring alignment information of the patches of at least one of the 1st to Mth patch groups scanned by the evaluation member, and a recognition means for recognizing the alignment information of the control patches in the at least one of the 1st to Mth patch groups. The recognition means of the color print quality evaluation apparatus compares the alignment information of the control patches acquired by the detection means with the alignment information of the control patches previously stored in the memory means, so that where they are matched to one another, the recognition means recognizes that the patch groups have been scanned in the order from the 1st to Mth patch groups by the evaluation member and transmits print quality information of the control patches of the respective patch groups evaluated by the evaluation member in the order in which the patch groups have been scanned in the scanning direction, and where they are not matched, the recognition means recognizes that the patch groups have been scanned in the order from the Mth to 1st patch groups by the evaluation member and transmits print quality information of the control patches of the respective patch groups evaluated by the evaluation member in the order reversed relative to the scanning direction. Whereby, the print control part of the color printing press adjusts the amounts of inks set by the 1st to Mth ink fountain keys, based on the ink quality information in the order in which they are transmitted from the evaluation member of the color print quality evaluation apparatus.

In the color print quality control system, as described above, the recognition means of the color print quality evaluation apparatus compares the alignment information of the control patches acquired by the detection means with the alignment information of the control patches previously stored in the memory means, so that where they are matched to one another, the recognition means recognizes that the patch groups have been scanned in the order from the 1st to Mth patch groups by the evaluation member and transmits print quality information of the control patches of the respective patch groups evaluated by the evaluation member in the order in which the patch groups have been scanned in the scanning direction, and where they are not matched, the recognition means recognizes that the patch groups have been scanned in the order from the Mth to 1st patch groups by the evaluation member and transmits print quality information of the control patches of the respective patch groups evaluated by the evaluation member in the order reversed relative to the scanning direction. The print control part of the color printing press adjusts the amounts of inks set by the 1st to Mth ink fountain keys, based on the ink quality information in the order in which they are transmitted from the evaluation member of the color print quality evaluation apparatus. Whereby, even if the print Q is turned 180° horizontally according to needs and circumstances, it is possible to omit the necessity to provide such as a 180-degree turn switch and hence omit a troublesome work such as pressing the switch by the operator for evaluation of the color print quality.

In the above color print quality control system, the color printing press may be a double-sided color printing press that prints the color print images and the color bars respectively on both sides of each substrate. In this case, the printing part of the double-sided color printing press includes a first printing section that prints a first color print image composed of plural basic different colors and a first color bar for evaluation of the respective plural basic different colors on a first side of each of substrates transferred in a given transfer direction by a first ink fountain for the plural basic different colors, the first ink fountain being equipped with 1st to Mth (M is an integer of 2 or larger) ink fountain keys aligned in a first alignment direction crossing substantially at right angle to the transfer direction, the first color bar being comprised of 1st to Mth first control patch groups each comprised of control patches of plural colors respectively corresponding to the plural basic different colors, the control patches of the first control patch groups being aligned in the first alignment direction respectively corresponding to the 1st to Mth ink fountain keys, and a second printing section that prints a second color print image composed of the plural basic different colors and a second color bar for evaluation of the respective plural basic different colors on a second side of each of the substrates by a second ink fountain for the plural basic different colors, the second ink fountain being equipped with 1st to Mth (M is an integer of 2 or larger) ink fountain keys aligned in a second alignment direction crossing substantially at right angle to the transfer direction, the second color bar being comprised of 1st to Mth second control patch groups each comprised of control patches of plural colors respectively corresponding to the plural basic different colors, the control patches of the second control patch groups being aligned in the second alignment direction respectively corresponding to the 1st to Mth ink fountain keys. The print control part adjusts the amounts of inks set by the 1st to Mth ink fountain keys of the first printing section based on the print quality information of the control patches of the 1st to Mth control patch groups on the first side of the substrate printed by the first printing section and adjusts the amounts of inks set by the 1st to Mth ink fountain keys of the second printing section based on the print quality information of the control patches of the 1st to Mth control patch groups on the second side of the substrate printed by the second printing section.

In the above case, the first and second color bars are respectively printed at the first and second printing sections so as not to have a common color between at least the Nth (N is an integer of 1 or larger) control patch in the first alignment direction and the direction opposite to the first alignment direction of each of the 1st to Mth first control patch groups and at least the Nth control patch in the second alignment direction and the direction opposite to the second alignment direction of each of the 1st to Mth second control patch groups. Accordingly, the memory means of the color print quality evaluation apparatus previously stores the color of at least one of the at least Nth control patch in the first alignment direction and the direction opposite to the first alignment direction of each of the 1st to Mth first control patch groups printed on the first side of the substrate and the at least Nth control patch in the second alignment direction and the direction opposite to the second alignment direction of each of the 1st to Mth second control patch groups printed on the second side of the substrate. Further, the evaluation member includes a measuring division capable of recognizing colors of the control patches of the scanned control patch groups. This detection means detects the color of at least the Nth control patch in the scanning direction of at least one of the first and second patch groups on the substrate with the first and second color bars printed thereon by the first and second printing sections so as not to have the common color, thus acquiring the alignment information of the control patches in the detected control patch group. Whereby, the recognition means checks the color of the at least the Nth control patch detected by the detection means against the colors of the control patches previously stored in the memory means, thereby recognizing whether the color bar of the patch groups detected by the detection means has been printed on the first or second side of the substrate. As a result, it is possible to facilitate the print quality control operation for the color print images on the respective sides of the double-sided color print, while limiting occurrence of the misoperation in execution of the print quality control by the operator and hence limiting occurrence of defective prints.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
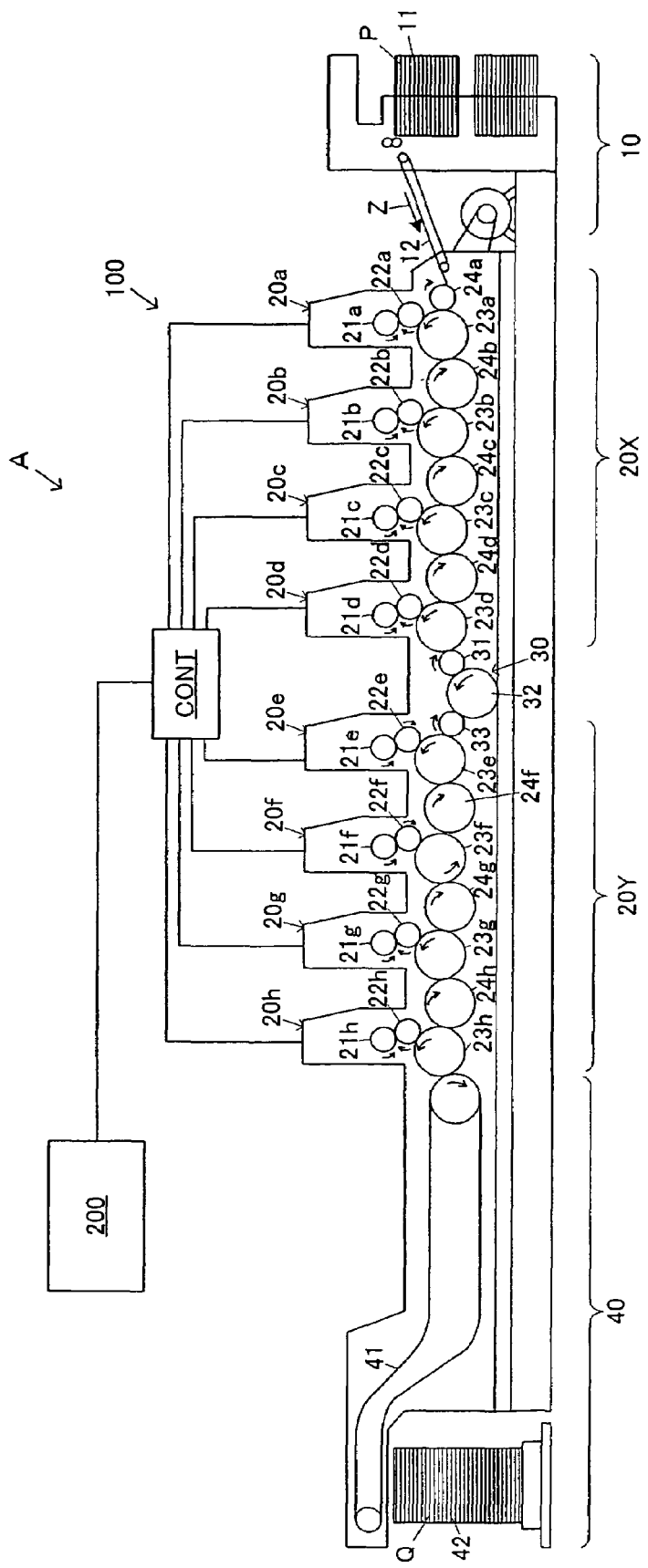
FIG. 1 illustrates a schematic structure of one example of a double-sided color print quality control system that carries out a method of recognizing color bars on a double-sided color print according to the present invention, which includes a double-sided color printing press and a color print quality evaluation apparatus.

Now, the description will be made for an embodiment of the present invention with reference to the drawings attached hereto. FIG. 1 illustrates a schematic structure of one example of the double-sided color print quality control that carries out the method of recognizing color bars on a double-sided color print according to the present invention, namely a system A which includes a double-sided color printing press 100 and a color print quality evaluation apparatus 200. The members 100 and 200 are presented merely as examples and therefore the system of the present invention do not necessarily have these members.

The double-sided color printing press 100 of FIG. 1 includes a sheet feeding section 10 for feeding substrates P (herein, sheets) to the downstream side, first and second printing sections 20X, 20Y for printing on the sheets P fed from the sheet feeding section 10, a sheet-turn-over device 30 located between the first and second printing sections 20X and 20Y for turning upside down the sheets P with a first side printed at the first printing section 20X of the upstream side of the sheet-turn-over device 30, and a sheet discharging section 40 for discharging double-sided color prints Q printed at the first and second printing sections 20X, 20Y.

More specifically, the double-sided color printing press 100 is operated in the manner described as follows. Sheets P are fed from the sheet feeding section 10 to the first printing section 20X that includes plural printing units (herein, four printing units 20a-20d) located upstream to the sheet-turn-over device 30 in a sheet transfer direction Z. The sheets P are printed on their first sides at these printing units 20a-20d and then turned upside down by the sheet-turn-over device 30 to have second sides printed by plural printing units (herein, four printing units 20e-20h) of the second printing section 20Y located downstream to the sheet-turn-over device 30 in the sheet transfer direction Z. The sheets P with their first and second sides printed are then discharged through the sheet discharging section 40 to have prints Q.

The sheet feeding section 10 includes a stock part 11 and a feeding part 12. The stock part 11 is designed to be capable of storing sheets P, while the feeding part 12 is designed to be capable of pulling out sheets P one by one from a stack of the sheets 11 stored in the stock part 11 and feeding the same to the first printing section 20X. Whereby, the sheets P can be fed to the first printing section 20X.

As described above, the first printing section 20X includes the printing units 20a-20d, and the second printing section 20Y includes the printing units 20e-20h. The printing units 20a-20h of the first and second printing sections 20X, 20Y respectively include plate cylinders 21a-21h, blanket cylinders 22a-22h and impression cylinders 23a-23h arranged in combination with each other to constitute a main constitutional element in each printing unit.

Reference numerals 24a in the printing unit 20a, 24b-24d and 24f-24h in the printing units 20b-20d and 20f-20h all represent transfer cylinders. Reference numerals 31, 32 and 33 in the sheet-turn-over device 30 respectively represent a transfer cylinder, a turnover and transfer cylinder, and a turnover cylinder.

In the respective printing units 20a-20h, the plate cylinders 21a-21h respectively have printing plates (not shown) mounted therearound. Ink and water are fed onto these plates to have ink transferred onto the blanket cylinders 22a-22h from the plates. Ink transferred onto the blanket cylinders 22a-22h is then transferred onto upcoming sheets held and transferred by the blanket cylinders 22a-22h and the impression cylinders 23a-23h. Whereby, the sheets P fed from the sheet feeding section 10 can be printed correspondingly to the plates respectively mounted on the plate cylinders 21a-21h.

More specifically, the first printing section 20X is designed to print a first color print image composed of plural basic different colors (herein, black (K), cyan (C), magenta (M) and yellow (Y)) on the first side of each sheet P with the printing units 20a-20d, which respectively print black (K), cyan (C), magenta (M) and yellow (Y) inks. The second printing section 20Y is designed to print a second color print image composed of the plural basic different colors (herein, black (K), cyan (C), magenta (M) and yellow (Y)) on the second side of each sheet P with the printing units 20e-20h, which respectively print black (K), cyan (C), magenta (M) and yellow (Y) inks.

At the time of printing the color print images, the printing units 20a-20d of the first printing section 20X print a first color bar for evaluation of the respective basic colors of the first color print image, while the printing units 20e-20h of the second printing section 20Y print a second color bar for evaluation of the respective basic colors of the second color print image. The first and second color bars will be later described in detail.

The sheet discharging section 40 includes a transfer part 41 and a stock part 42. In this sheet discharging section 40, prints Q transferred through the impression cylinder 23h of the printing unit 20h are transferred along a bottom side (not shown) of the transfer part into the stock part 42 with its leading end held by a holding member (not shown) of the transfer part 41. The stock part 42 is designed to be capable of storing prints Q transferred thereinto.

Figure 2:
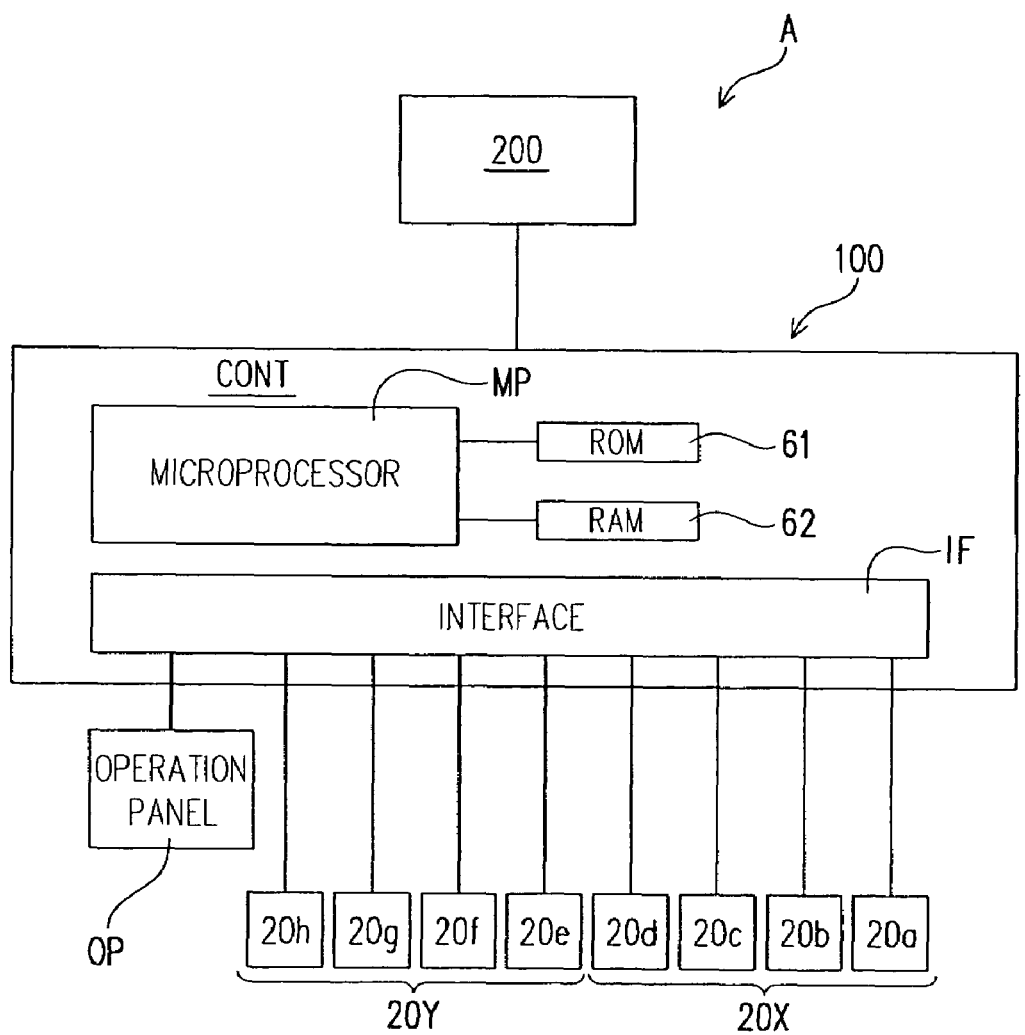
FIG. 2 is a schematic block diagram, which mainly illustrates a print control part of the double-sided color printing press, to which the color print quality evaluation apparatus of FIG. 1 is connected.

The double-sided color printing press 100 of FIG. 1 further includes a print control part CONT, to which the color print quality evaluation apparatus 200 is connected. FIG. 2 is a schematic block diagram, which mainly illustrates the print control part CONT of the double-sided printing press, to which the color print quality evaluation apparatus 200 of FIG. 1 is connected.

The print control part CONT is designed to control the entire operation of the double-sided color printing press 100, and, as illustrated in FIG. 2, includes a ROM 61 that stores programs and data required for processing printing operation, a microprocessor MP that reads out data from the ROM 61 and processes and controls the same, a RAM 62 that temporarily stores data required for the operation of the microprocessor MP, and an interface IF that inputs data into the microprocessor MP and outputs data therefrom. An operation panel OP for input of the information required for printing and operation information, as well as the printing units 20a-20h are connected to the print control part CONT via the interface IF.

This print control part CONT also includes a means to control the amounts of inks to be fed to the printing units 20a-20d in the first printing section 20X for printing the first side of each sheet P based on a value representative of the print quality (herein the density) of the first color bar printed on the first side of the print Q, which value is acquired by scanning the first color bar in the color print quality evaluation apparatus 200 and a reference value stored in the ROM 61, and control the amounts of inks to be fed to the printing units 20e-20h in the second printing section 20Y for printing the second side of each sheet P based on a value representative of the print quality (herein the density) of the second color bar printed on the second side of each print Q, which value is acquired by scanning the second color bar in the color print quality evaluation apparatus 200. Whereby, the print quality of the color print images on both sides of the double-sided color print Q can be controlled.

Figure 3:
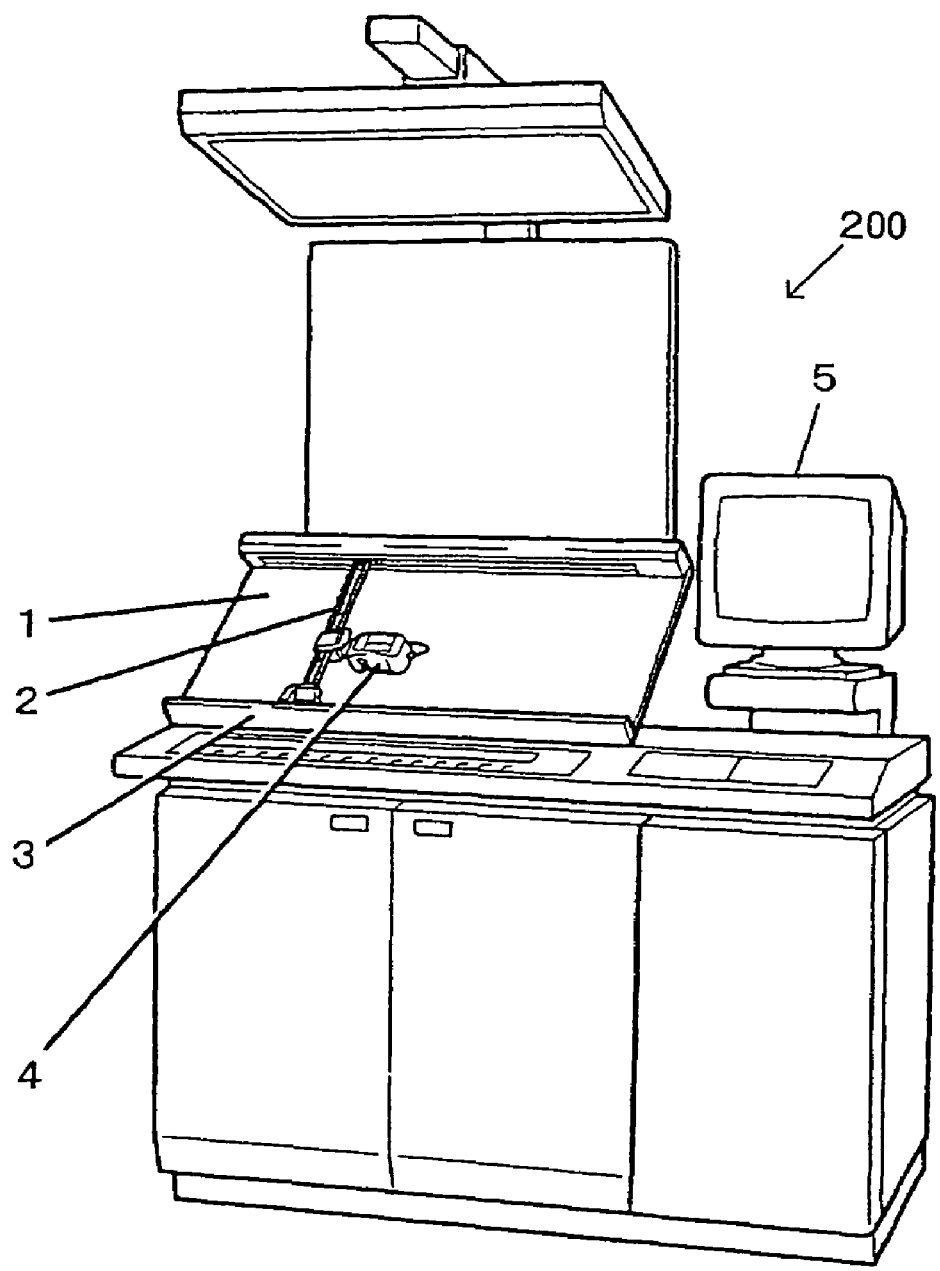
FIG. 3 is a schematic perspective view of the color print quality evaluation apparatus of FIG. 1.
Figure 4:
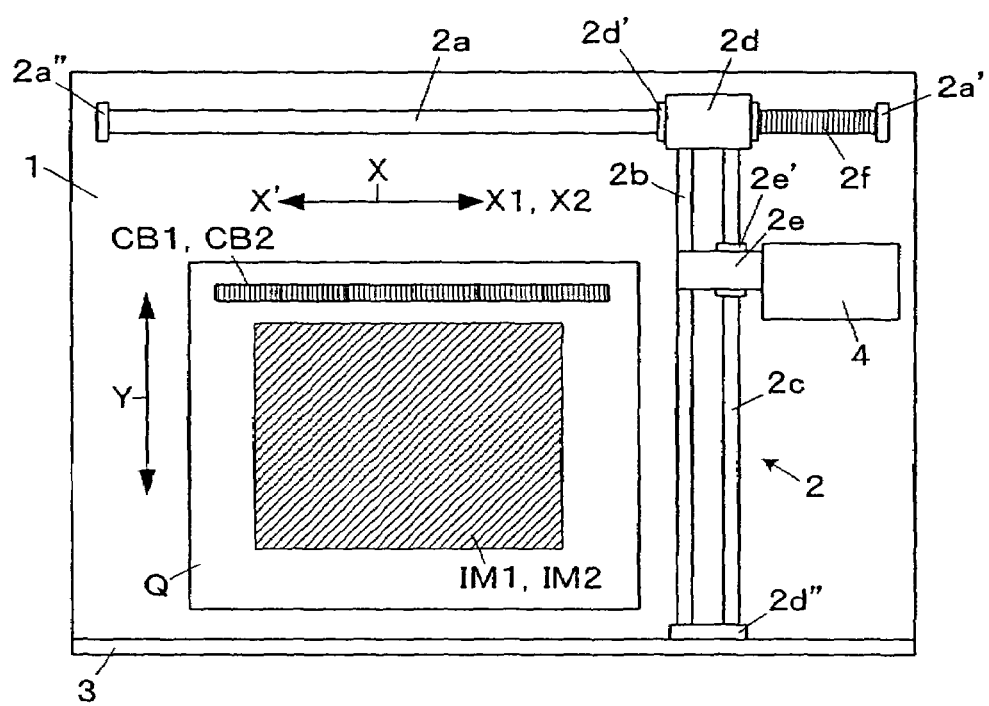
FIG. 4 is a schematic plan view of an essential portion of the color print quality evaluation apparatus of FIG. 3.

FIG. 3 is a schematic perspective view of the color print quality evaluation apparatus 200 of FIG. 1. FIG. 4 is a schematic plan view of an essential portion of the color print quality evaluation apparatus 200 of FIG. 3.

The color print quality evaluation apparatus 200 in this embodiment is herein designated as a color print density measuring apparatus for measuring the density of a color print, and includes a print mounting table 1, an evaluation member 2 with a scanning section 4, and a scanning guide 3. This color print quality density measuring apparatus 200 is designed to evaluate the print quality (herein the density) of a first color bar CB1 printed on the first side of print Q by scanning the first color bar CB1 of the print Q mounted on the print mounting table 1 with the first side up by the scanning section 4 of the evaluation member 2, which is guided along the scanning guide 3, and evaluate the print quality (herein the density) of a second color bar CB2 printed on the second side of the print Q by scanning the second color bar CB2 of the print Q, which is turned upside down and mounted on the print mounting table 1 with the second side up by the operator, in the same scanning manner, for evaluation of the print qualities of color print images IM1, IM2 printed on both sides of the print Q.

As illustrated in FIG. 4, the print mounting table 1 has a flat surface providing a given region on which the print Q is mounted.

The evaluation member 2 is made up of an X-axis rod 2a extending in a first direction (an X direction in the Figure), Y-axis rods 2b, 2c extending crossing at right angle or substantially at right angle to the first direction X, a first moving head 2d movable in the first direction X, a second moving head 2e movable in the first and second directions X, Y, a coil spring 2f and the aforesaid scanning section 4.

The X-axis rod 2a is provided with fixing blocks 2a', 2a" respectively having holes (not shown), into which the X-axis rod 2a is tightly fitted. These fixing blocks 2a', 2a" are secured to the table 1 so as to be extended in the first direction X with a given distance to the surface of the print mounting table 1.

The first moving head 2d includes a bearing 2d' having a through-hole (not shown) mounted therein, through which the first moving head 2d can be slid along the X-axis rod 2a, thereby allowing the first moving head 2d to be reciprocated in the first direction X along the X-axis rod 2a.

The Y-axis rods 2b, 2c respectively have first ends tightly fitted into holes (not shown) of the first moving head 2d and second ends tightly fitted into holes (not shown) of a moving guide 2d", while being aligned parallel to each other in the first direction X. With this arrangement, the moving guide 2d" and the first moving head 2d together allow the Y-axis rods 2b, 2c to be reciprocated in the first direction X while maintaining the parallel or substantially parallel relationship between the Y-axis rods 2b, 2c.

The second moving head 2e carries the scanning section 4 and has a pair of holes (not shown), allowing the Y-axis rod 2b to be fitted into one of these holes for sliding movement of the scanning section 4 therealong and the Y-axis rod 2c to be fitted into another hole for sliding movement of the scanning section 4 therealong via a bearing 2e' mounted in another hole. With this arrangement, the second moving head 2e can be reciprocated in the second direction Y along the Y-axis rods 2b, 2c while maintaining the parallel or substantially parallel relationship with the surface of the print mounting table 1. The scanning guide 3 prevents the vertical movement of the moving guide 2d" relative to the print mounting table 1, allowing the same only to move in the first direction X.

Thus, the scanning section 4 can move not only in the first direction X along the X-axis rod 2a connected to the first moving head 2d, but also in the second direction Y along the Y-axis rods 2b, 2c via the second moving head 2e for reciprocal movement in the first and second directions X, Y.

The coil spring 2f is mounted on the X-axis rod 2a between the first moving head 2d and the fixing blocks 2a" with first and second ends respectively connected to the first moving head 2d and the fixing block 2a'. With this arrangement, the first moving head 2d is urged towards the fixing block 2a' in the first direction by the coil spring 2f. The operator manually moves the first moving head 2d in a direction X' opposite to scanning directions X1, X2 towards the fixing blocks 2a", so that the first moving head 2d once moved towards the fixing blocks 2a" can be automatically returned towards the fixing block 2a'. Thus, the scanning section 4 can scan the color bars CB1, CB2 printed on print Q on the print mounting table 1 in the scanning directions X1, X2.

Figure 5A:
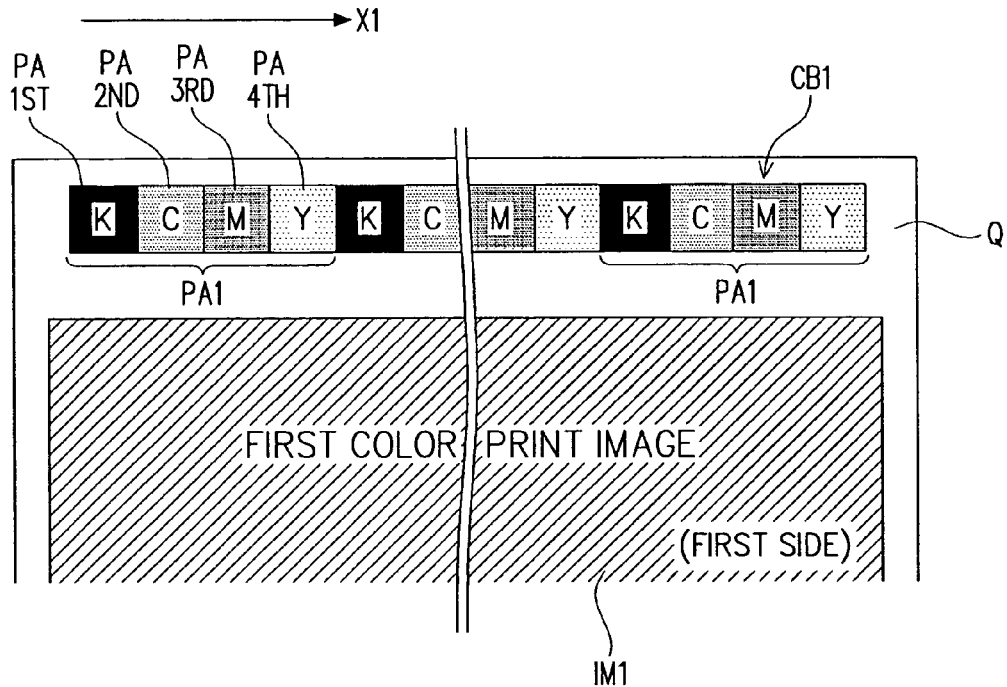
FIG. 5A is an enlarged view of a first color bar and its periphery of a double-sided color print with a first side printed at a first printing section of the double-sided color printing press of FIG. 1.
Figure 5B:
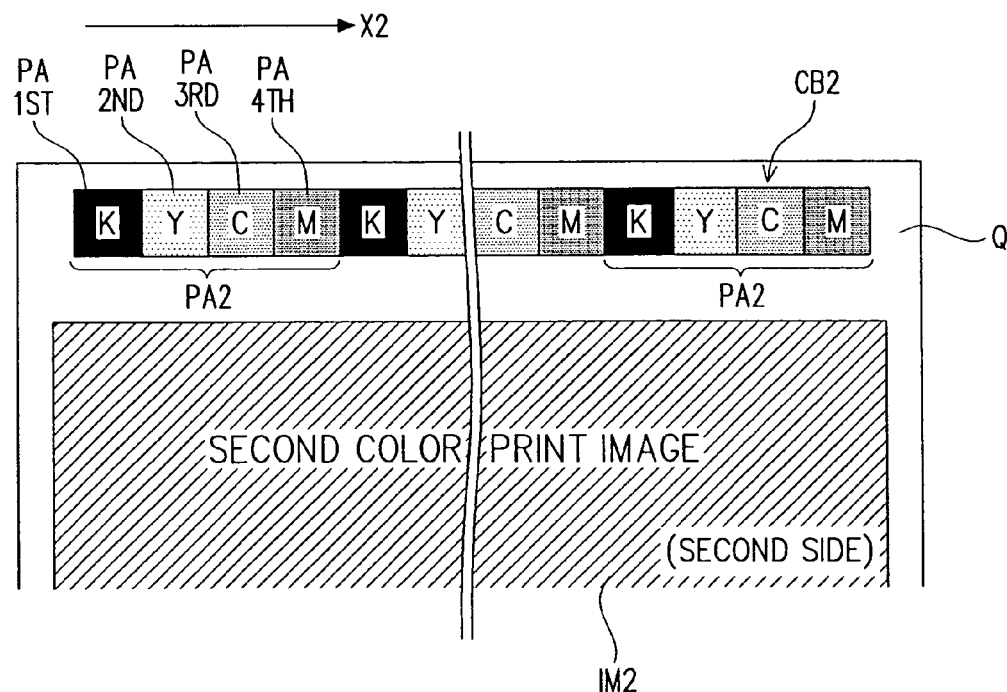
FIG. 5B is an enlarged view of a second color bar and its periphery of a double-sided color print with a second side printed at a second printing section of the double-sided color printing press of FIG. 1.

FIG. 5A is an enlarged view of the first color bar CB1 printed on the first side of the double-sided color print Q at the first printing section 20X of the double-sided color printing press 100 and its peripheral portion. FIG. 5B is an enlarged view of the second color bar CB2 printed on the second side of the double-sided color print Q at the second printing section 20Y of the double-sided color printing press 100 and its peripheral portion.

As illustrated in FIG. 5A, the first color bar CB1 printed on the first side of the print Q printed at the first printing section 20X of the double-sided color printing press 100 of FIG. 1 for evaluation of the respective basic colors of the first color print image IM1 is comprised of first control patch groups PA1 aligned in a first alignment direction (the direction X1 in the Figure), each control patch group PA1 comprised of plural control patches PA of plural colors aligned in the first alignment direction X1 respectively corresponding to basic four colors (herein, black (K), cyan (C), magenta (M) and yellow (Y)) together composing the first color print image IM1, which control patches in each group being aligned in the order of black (K), cyan (C), magenta (M) and yellow (Y) in this embodiment. Also, as illustrated in FIG. 5B, the second color bar CB2 printed on the second side of the print Q printed at the second printing section 20Y of the double-sided color printing press 100 of FIG. 1 for evaluation of the respective basic colors of the second color print image IM2 is comprised of second control patch groups PA2 aligned in a second alignment direction (the direction X2 in the Figure), each control patch group PA2 comprised of plural control patches PA of plural colors aligned respectively corresponding to basic four colors (herein, black (K), cyan (C), magenta (M) and yellow (Y)) together composing the second color print image IM2 in the second alignment direction X2, which control patches in each group being aligned in the order different from that of the first control patch groups, namely in the order of black (K), yellow (Y), cyan (C) and magenta (M) in this embodiment. In this embodiment, the control patch groups each are comprised of only the control patches corresponding to the basic colors of the color print image, while the present invention is not limited to this, allowing the control patch groups each to further contain control patches other than the basic colors of the color print image.

More specifically, the first and second color bars CB1, CB2 on both sides of the print Q printed at the first and second printing sections 20X, 20Y of the double-sided color printing press 100 are so printed as to have color(s) of at least Nth control patch (N is an integer of 1 or larger; herein the 2nd to 4th patches) of each first control patch group in the first alignment direction different from color(s) of the corresponding Nth control patch (herein the 2nd to 4th patches) of each second control patch group in the second alignment direction.

Figure 6:
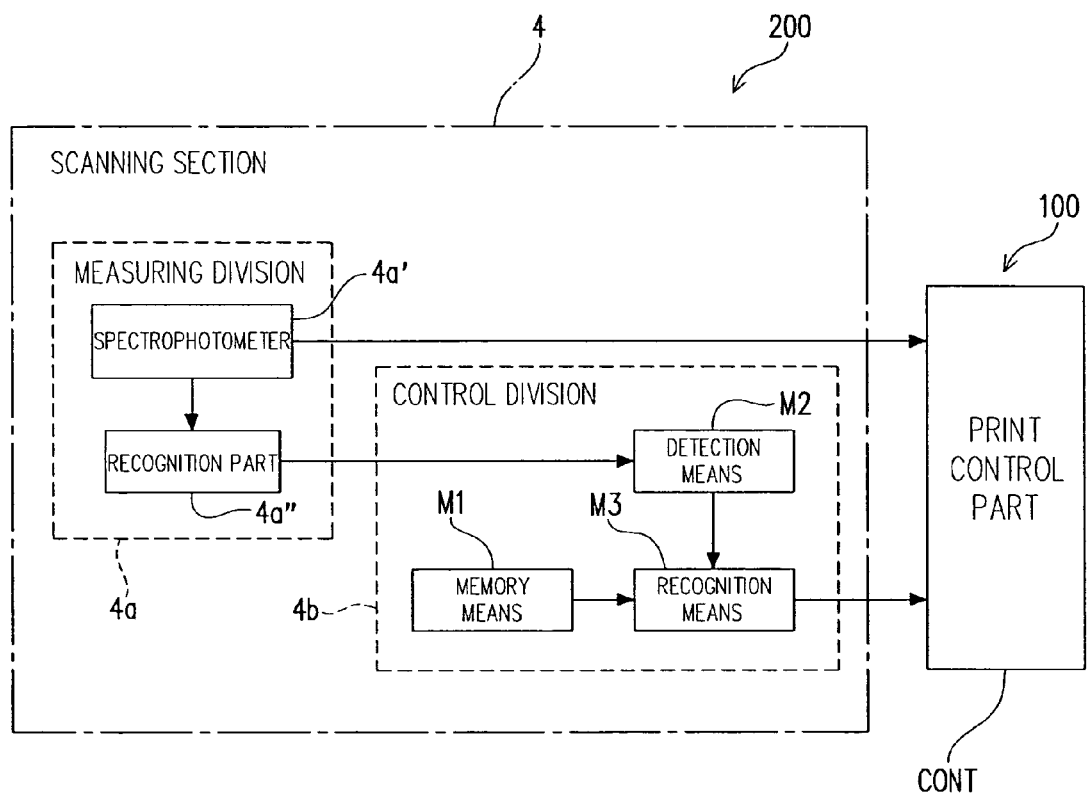
FIG. 6 is a schematic block diagram, which mainly illustrates an evaluation member of a color print density measuring apparatus of FIGS. 3 and 4.
Figure 7:
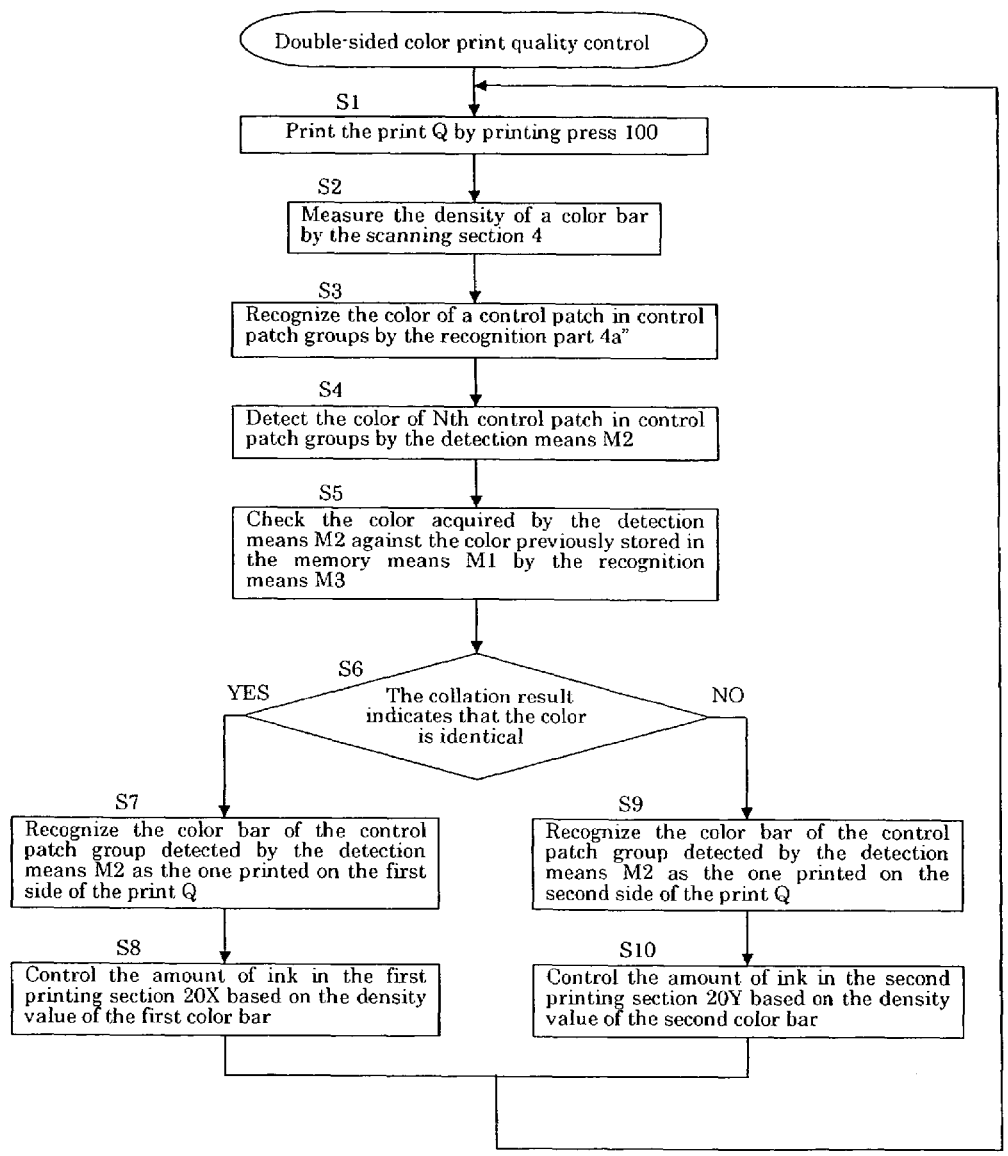
FIG. 7 is a flowchart illustrating the operation flow of the color print quality control system of FIG. 1.

FIG. 6 is a schematic block diagram, which mainly illustrates the scanning section 4 of the color print density measuring apparatus 200 of FIGS. 3 and 4. FIG. 7 is a flowchart illustrating the operation flow of the color print quality control system A of FIG. 1. As illustrated in FIG. 6, the scanning section 4 of the color print density measuring apparatus 200 includes a measuring division 4a and a control division 4b.

The measuring division 4a herein includes a spectrophotometer 4a' and a recognition part 4a". The spectrophotometer 4a' is designed to be capable of detecting the density of each control patch PA of the first and second color bars CB1, CB2 on the respective sides of the print Q by measuring the spectral reflectance of each control patch PA. This spectrophotometer 4a' is connected to the print control part CONT while being connected to the control division 4b via the recognition part 4a". The recognition part 4a" is to recognize the color of each control patch PA of the first and second control patch groups PA1, PA2 based on the result of the density detection by the spectrophotometer 4a'. With this arrangement, the measuring division 4a is capable of sending the density values of the color bars CB1, CB2 on the print Q measured by the spectrophotometer 4a' to the print control part CONT, and sending the information representative of the color of each control patch of the control patch groups PA1, PA2 recognized by the recognition part 4a' to the control division 4b.

The control division 4b is connected to the measuring division 4a, as described above, and also to the print control part CONT of the double-sided color printing press 100. This control division 4b is to control the entire operation of the density measuring apparatus 200 and is mainly comprised of a computer with a memory means M1, a detection means M2 and a recognition means M3.

The memory means M1 previously stores at least one of the color of at least the Nth control patch PA in the first alignment direction of the first control patch group PA1 printed on the first side of substrate P and the color of at least the Nth control patch PA in the second alignment direction of the second control patch group PA2 printed on the second side of the substrate P. Herein, the information representative of the color (cyan (C)) of the second control patch PA in the first alignment direction X1 of the first control patch group PA1 is stored (see FIG. 5A) in the manner as follows:

Side of the Print Q: First side, Order in the Alignment Direction: 2nd, and Color of the Control Patch: Cyan (C).

The detection means M2 is to acquire alignment information of the control patches in at least one of the first and second control patch groups PA1, PA2 scanned by the evaluation member 2. More specifically, for acquiring the alignment information of the control patches PA of the control patch groups PA1, PA2 on the print Q, on which the first and second color bars CB1, CB2 are printed at the first and second printing sections 20X, 20Y with at least the Nth (herein the 2nd) control patch in the first alignment direction of the first control patch groups PA1 being different in color from at least the Nth control patch in the second alignment direction of the second control patch groups PA2, the detection means M2 detects the color of at least the Nth (herein the 2nd) control patch PA in the scanning direction identical to the alignment direction in at least one of the first and second control patch groups PA1, PA2. In this embodiment, where the first side of the print Q is measured by the measuring division 4a for the control patches PA of the first control patch groups PA1 printed on the first side of the print Q as illustrated in FIG. 5A, cyan (C) of the 2nd control patch PA of the most upstream control patch group PA1 (a leftmost patch group in the Figure) in the scanning direction X1 identical to the first alignment direction X1 is detected. Where the second side of the print Q is measured by the measuring division 4a for the control patches PA of the second control patch groups PA2 printed on the second side of the print Q as illustrated in FIG. 5B, yellow (Y) of the 2nd control patch PA of the most upstream control patch group PA2 (a leftmost patch group in the Figure) in the scanning direction X2 identical to the second alignment direction X2 is detected.

The recognition means M3 of FIG. 6 is to recognize whether each of the color bars is printed on the first side or second side of the print Q based on the alignment information of the control patches PA of the control patch groups acquired by the detection means M2. More specifically, at the time of recognition of the color bars, the recognition means M3 checks the color of at least the Nth control patch in the scanning direction of the control patch groups detected by the detection means M2 against the color of at least the Nth control patch in the alignment direction of the control patch groups previously stored in the memory means M1 (herein, cyan (C) of the 2nd control patch PA in the first alignment direction X1 of the first control patch groups PA1), and accordingly recognizes whether the color bar of the control patch groups detected by the detection means M2 has been printed on the first or second side of the print Q.

This double-sided color print quality control system A is so constructed as to automatically transmit the information recognized by the recognition means M3 from the color print quality evaluation apparatus 200 to the double-sided color printing press 100. A given display means (e.g., a display means 5 of the color print quality evaluation apparatus 200, as illustrated in FIG. 3) may be provided to display the aforesaid recognized information thereon, allowing the operator to visually observe the recognized information and then send or set the displayed information to the printing press 100.

According to the method of recognizing the color bars CB1, CB2 on the double-sided color print Q, as well as the double-sided color print quality control system A and the color print quality evaluation apparatus 200, as illustrated in FIG. 7, for the quality evaluation of the color print images IM1, IM2 on the double-sided color print Q, the double-sided color printing press 100 first prints the first color print image IM1 and the first color bar CB2 on the first side of substrate P, and the second color print image IM2 and the second color bar CB2 on the second side of the substrate P (Step S1).

Then, of the first and second control patch groups PA1, PA2 on the print Q, the scanning part 4 of the evaluation member 2 in the double-sided color printing press 100 scans at least one of the first control patch groups PA1 in the scanning direction X1 identical to the first alignment direction X1, and at least one of the second control patch groups PA2 in the scanning direction X2 identical to the second alignment direction X2. Thus, the density of each of the first and second control patch groups PA1, PA2 is measured (Step S2).

At this time, the recognition part 4a" of the scanning part 4 recognizes the color of a control patch in at least one of the first and second control patch groups PA1, PA2 scanned by the scanning part 4 (Step S3), and then the detection means M2 of the control division 4b detects the color of at least the Nth (herein the 2nd) control patch in at least one of the first and second control patch groups PA1, PA2 of the print Q measured by the recognition part 4a" of the scanning part 4 (Step S4).

Then, the recognition means M3 checks the color of at least the 2nd control patch PA in the scanning direction of the control patch group detected by the detection means M2 against the color of at least the 2nd control patch (herein, cyan (C)) in the first alignment direction X1 of the first control patch groups previously stored in the memory means M1 (Step S5). When the collation result indicates that the color is identical (Step S6), the color bar of the control patch group detected by the detection means M2 is recognized as the first color bar CB1 printed on the first side of the print Q (Step S7), so that the ink control for the printing units 20a-20d in the first printing section 20X is made based on the density value of the first color bar CB1 (Step S8). When the collation result indicates that the color is not identical (Step S6), the color bar of the control patch group detected by the detection means M2 is recognized as the second color bar CB2 printed on the second side of the print Q (Step S9), so that the ink control for the printing units 20e-20h in the second printing section 20Y is made based on the density value of the second color bar CB2 (Step S10).

As described above, according to the method of recognizing the color bars CB1, CB2 on the double-sided color print Q, as well as the double-sided color print quality control system A and the color print quality evaluation apparatus 200, the print quality can be controlled for all the basic colors of the color print images IM1, IM2 on the respective sides of the double-sided color print Q, since the first control patch groups PA1 on the first side of the print Q printed by the double-sided color printing press 100 each correspond to all the basic colors of the first color print image IM1, while the second control patch groups PA2 on the second side of the print Q each correspond to all the basic colors of the second color print image IM2.

Also, according to the present invention, the double-sided color printing press 100 prints the first color bar CB1 comprised of one or more first control patch groups PA1 aligned in the first alignment direction and each comprised of plural control patches PA aligned in the first alignment direction on the first side of the print Q, and the second color bar CB2 comprised of one or more second control patch groups PA2 aligned in the second alignment direction and each comprised of plural control patches aligned in the second alignment direction in the order different from the order of the plural control patches PA of the one or more first control patch groups PA2 aligned in the first alignment direction. Then, at least one of the first and second control patch groups PA1, PA2 is scanned in the scanning direction identical to the alignment direction of the control patches of the the scanned control patch group so as to recognize whether the scanned color bar is printed on the first or second side of the print Q. As a result, it is possible to facilitate the print quality control operation for the color print images IM1, IM2 on the respective sides of the double-sided color print, while limiting the occurrence of the misoperation in execution of the print quality control by the operator and hence limiting occurrence of defective prints.

In this embodiment, the information recognized by the recognition means M3 is automatically transmitted from the color print quality evaluation apparatus 200 to the double-sided color printing press 100, so that the operator does not need to check whether the detected color bar is printed on the first or second side of the print Q. Accordingly, it is possible to prevent the operator's misoperation in executing the print quality control and hence satisfactorily limit occurrence of defective prints.

Now, the description will be made for the color print quality control system A (i.e., the double-sided color print quality control system equipped with the double-sided color printing press 100 and the color print quality evaluation apparatus 200) according to another embodiment. In the following description, members, parts and the like particularly relating to this embodiment will be mainly discussed, while omitting the redundant description relating to the aforesaid constitutional elements of the double-sided color printing press 100 and the color print quality evaluation apparatus 200.

In the double-sided color printing press 100 of FIG. 1, the printing units 20a-20d of the first printing section 20X each are equipped with a first ink fountain (not shown) for plural basic different colors (herein, four colors), and each have the 1st to Mth (M is an integer of 2 or larger) ink fountain keys aligned in a first alignment direction W1 crossing substantially at right angle to a substrate transfer direction Z. The printing units 20e-20h of the second printing section 20Y each are equipped with a second ink fountain (not shown) for plural basic different colors (herein, four colors), and each have the 1st to Mth ink fountain keys aligned in a second alignment direction W2 crossing substantially at right angle to the substrate transfer direction Z. The first and second color print images, and the first and second color bars are respectively printed by these first and second ink fountains.

Figure 8A:
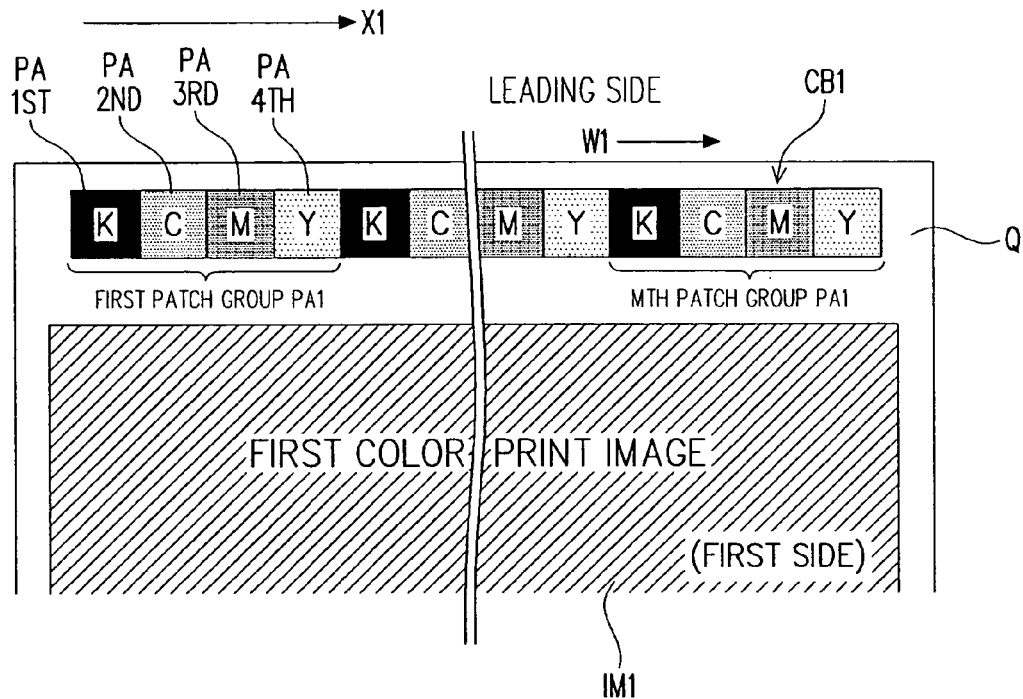
FIG. 8A is an enlarged view of a first color bar and its periphery of a double-sided color print with a first side printed at a first printing section of the double-sided color printing press in the color print quality control system of FIG. 1 according to another embodiment.
Figure 8B:
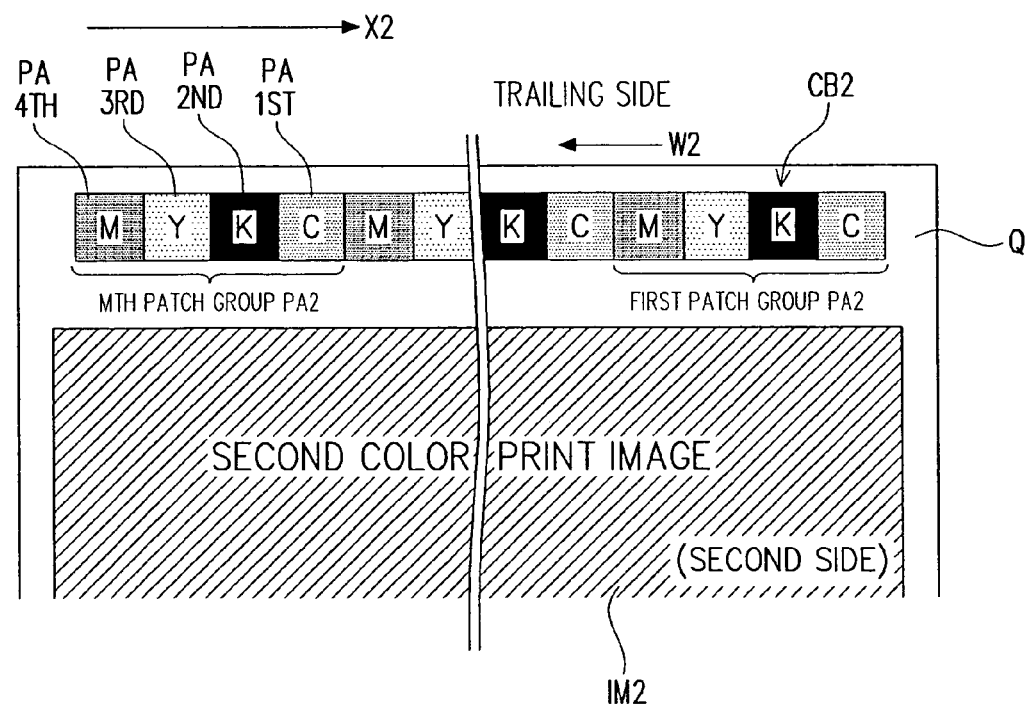
FIG. 8B is an enlarged view of a second color bar and its periphery of a double-sided color print with a second side printed at a second printing section of the double-sided color printing press in the color print quality control system of FIG. 1 according to another embodiment.

FIG. 8A is an enlarged view of the first color bar CB1 printed on the first side of the double-sided color print Q at the first printing section 20X of the double-sided color printing press 100 and its peripheral portion, in the color print quality control system A of FIG. 1 of another embodiment of the present invention, illustrating the color bar CB1 printed in the leading end region of the print Q with the 1st to Mth first patch groups PA1 aligned in a first alignment direction (a direction W1 in the Figure) crossing substantially at right angle to the substrate transfer direction Z. FIG. 8B is an enlarged view of the second color bar CB2 printed on the second side of the double-sided color print Q at the second printing section 20Y of the double-sided color printing press 100 and its peripheral portion, in the color print quality control system A of FIG. 1 of another embodiment of the present invention, illustrating the color bar CB2 printed in the trailing end region of the print Q with the 1st to Mth second patch groups PA2 aligned in a second alignment direction (a direction W2 in the Figure) crossing substantially at right angle to the substrate transfer direction Z. The print Q as illustrated in FIG. 8B is held in a state that it is turned 180° horizontally with the leading end side upward in the Figure.

As illustrated in FIG. 8A, the first color bar CB1 printed on the first side of the print Q printed at the first printing section 20X of the double-sided color printing press 100 of FIG. 1 for evaluation of the respective basic colors of the first color print image IM1 is comprised of the 1st to Mth first control patch groups PA1 aligned in the first alignment direction W1 corresponding in position to the 1st to Mth ink fountain keys of the first ink fountain, each control patch group PA1 being comprised of the plural control patches PA of plural colors arranged in the first alignment direction W1 respectively corresponding to basic four colors (herein, black (K), cyan (C), magenta (M) and yellow (Y)) together composing the first color print image IM1, which control patches in each group being aligned in the order of black (K), cyan (C), magenta (M) and yellow (Y) in this embodiment. Also, as illustrated in FIG. 8B, the second color bar CB2 printed on the second side of the print Q printed at the second printing section 20Y of the double-sided color printing press 100 of FIG. 1 for evaluation of the respective basic colors of the second color print image IM2 is comprised of the 1st to Mth second control patch groups PA2 aligned in the second alignment direction W2 corresponding in position to the 1st to Mth ink fountain keys of the second ink fountain, each control patch group PA2 comprised of the plural control patches PA of plural colors arranged in the first alignment direction W1 respectively corresponding to basic four colors (herein, black (K), cyan (C), magenta (M) and yellow (Y)) together composing the second color print image IM2, which control patches in each group being aligned in the order of cyan (C), black (K), yellow (Y) and magenta (M) in this embodiment.

More specifically, the first and second color bars CB1, CB2 are respectively printed on both sides of the print Q at the first and second printing sections 20X, 20Y so as not to have a common color between at least the Nth control patch PA in the first alignment direction W1 and the direction opposite to the direction WI (N is an integer of 1 or larger; herein the 2nd and 3rd control patches) of each of the first control patch groups PA1 and at least the Nth control patch PA in the second alignment direction W2 and the direction opposite to the direction W2 (herein the 2nd and 3rd control patches) of each of the second control patch groups.

The memory means M1 of FIG. 6 previously stores the alignment information (herein the information representative of the order of the patch's colors in the first and second alignment directions W1, W2 of the first and second control patch groups PA1, PA2 printed on the color print Q by the double-sided color printing press 100, in the manner stated below:

(Alignment information in the alignment direction W1 of the patches PA of the patch groups PA1)

1st: Black (K), 2nd: Cyan (C), 3rd: Magenta (M), 4th: Yellow (Y)

(Alignment information in the alignment direction W2 of the patches PA of the patch groups PA2)

1st: Cyan (C), 2nd: Black (K), 3rd: Yellow (Y), 4th: Magenta (M)

Also, the memory means M1 previously stores the colors of either or both of at least the Nth control patch in the first alignment direction W1 and the direction opposite to the direction W1 of the first control patch groups PA1 and at least the Nth control patch in the second alignment direction W2 and the direction opposite to the direction W2 of the second control patch groups PA2. Herein, the information representative of the colors (Cyan (C) and Magenta (M)) of the 2nd and 3rd control patches in the first alignment direction W1 and the direction opposite to the direction W1 is stored in the manner stated below:

Side of the Print Q: First side, Order in the Alignment Direction: 2nd and 3rd, Colors of the Control Patches: Cyan (C) and Magenta (M)

Further, for acquiring the alignment information of the control patches PA of the control patch groups PA1, PA2, the detection means M2 detects the color of at least the Nth control patch PA of at least one of the first and second control patch groups PA1, PA2 in given scanning directions (the directions X1, X2 in FIGS. 8A and 8B) on the double-sided color print Q with the first and second color bars CB1, CB2 respectively printed on both sides of the print Q at the first and second printing sections 20X, 20Y of the double-sided color printing press 100 so as not to have a common color between at least the Nth control patch PA in the first alignment direction W1 and the direction opposite to the direction W1 and at least the Nth control patch PA in the second alignment direction W2 and the direction opposite to the direction W2.

For the recognition of the color bars CB1, CB2, the recognition means M3 checks the color of at least the Nth control patch in the scanning directions X1, X2 of the control patch groups detected by the detection means M2 against the color of at least the Nth control patch in the alignment direction W1 and the direction opposite to the direction W1 of the control patch groups PA1 previously stored in the memory means M1, and accordingly recognizes whether the color bar of the control patch groups detected by the detection means M2 has been printed on the first or second side of the double-sided color print Q.

Further, the recognition means M3 compares the alignment information of the patches PA of the patch groups PA1, PA2 acquired by the detection means M2 with the alignment information of the patches PA of the patch groups PA1, PA2 previously stored in the memory means M1, so that where they are matched to one another, the recognition means M3 recognizes that the patch groups have been scanned in the order from the 1st to Mth patch groups PA1, PA2 by the evaluation member 2 and transmits the print quality information of the patches PA of the patch groups PA1, PA2 evaluated by the evaluation member 2, in the order in which the patch groups have been scanned in the scanning directions X1, X2 to the print control part CONT of the double-sided color printing press 100, and on the other hand, where they are not matched, the recognition means M3 recognizes that the patch groups have been scanned in the order from the Mth to 1st patch groups PA1, PA2 by the evaluation member 2 and transmits the print quality information of the patches PA of the patch groups PA1, PA2 evaluated by the evaluation member 2, in the order reversed relative to the scanning directions X1, X2.

In the double-sided color printing press 100, the print control part CONT adjusts the amounts of inks set by the 1st to Mth ink fountain keys of the first ink fountain of the first printing section 20X based on the print quality information of the patches PA of the 1st to Mth patch groups PA1 of the first color bar CB1 printed on the front side of the print Q at the first printing section 20X, and adjusts the amount of inks set by the 1st to Mth ink fountain keys of the second ink fountain of the second printing section 20Y based on the print quality information of the patches PA of the 1st to Mth patch groups PA2 of the second color bar CB2 printed on the second side of the print Q at the second printing section 20Y. That is, the amounts of inks set by the 1st to Mth ink fountain keys are adjusted based on the print quality information in the order in which these print quality information are transmitted from the evaluation member 2 of the color print quality evaluation apparatus 200.

Figure 9:
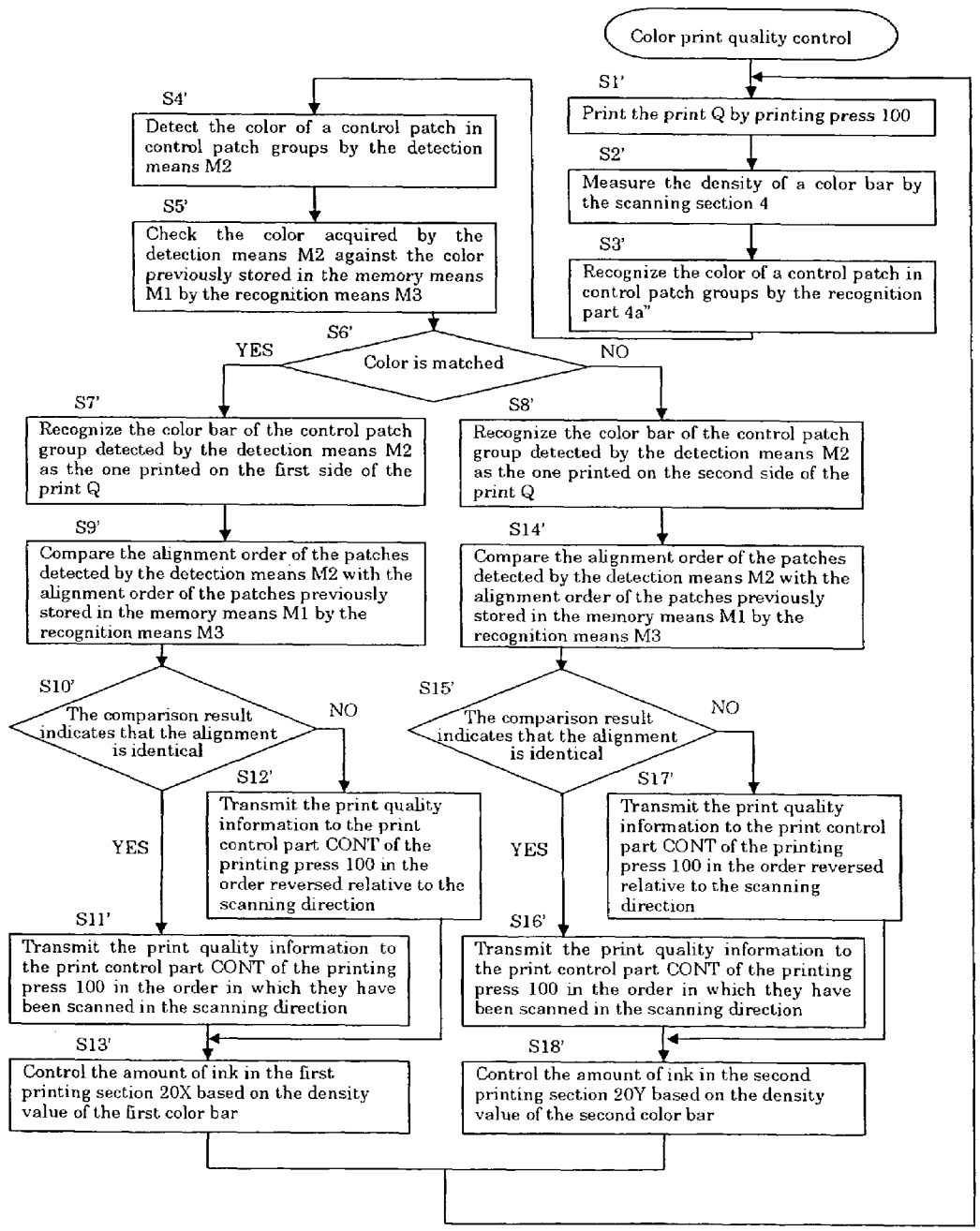
FIG. 9 is a flowchart illustrating the operation flow of the color print quality control system of FIG. 1 according to another embodiment.
Figure 10A:
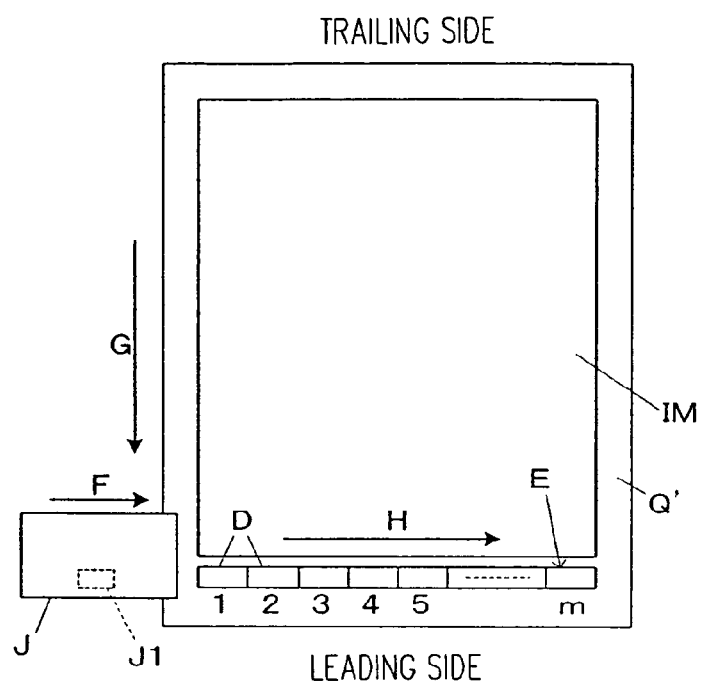
FIG. 10A illustrates a print with a color bar printed in the leading end region, which color bar being comprised of the 1st to Mth patches aligned in a direction crossing substantially at a right angle to the substrate transfer direction.
Figure 10B:
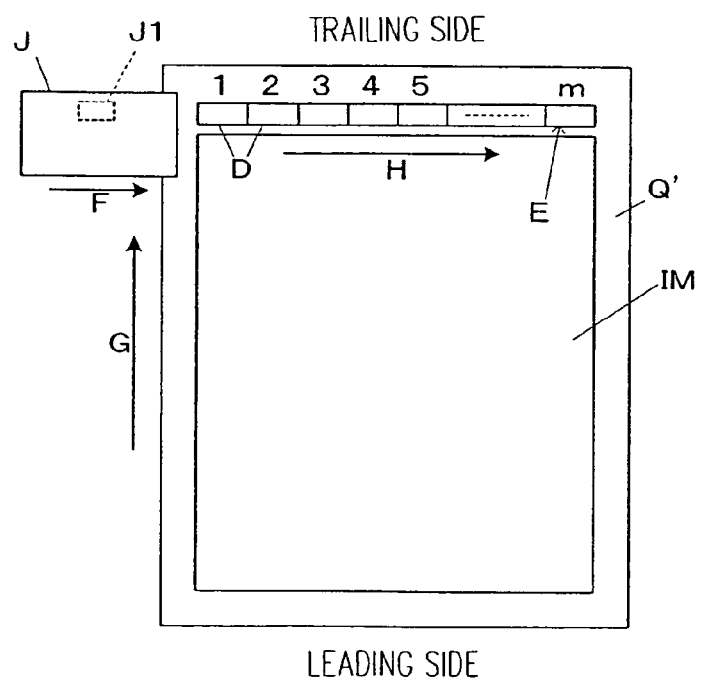
FIG. 10B illustrates the print with a color bar printed in the trailing end region, which color bar being comprised of the 1st to Mth patches aligned in a direction crossing substantially at a right angle to the substrate transfer direction.
Figure 11A:
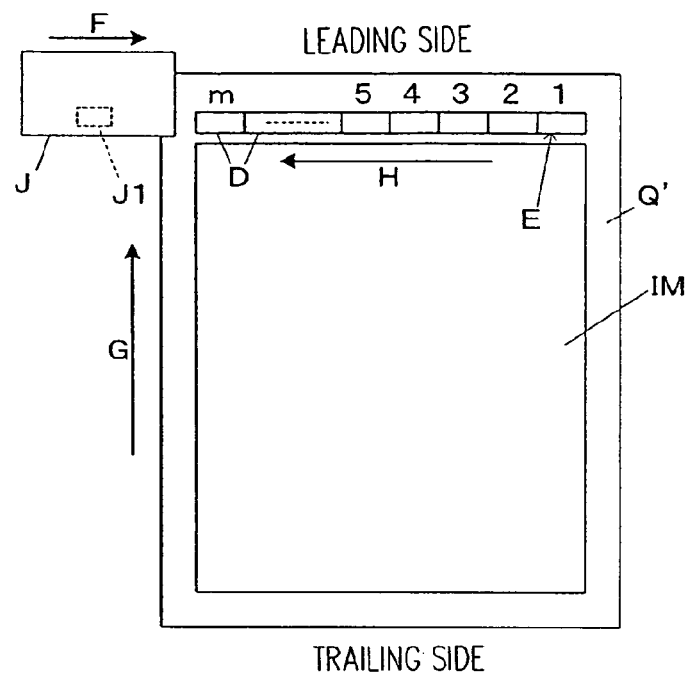
FIG. 11A illustrates an operational state where the print of FIG. 10A is turned 180° horizontally and then scanned by the scanning section with the image capturing part J1 located downward in the Figure.
Figure 11B:
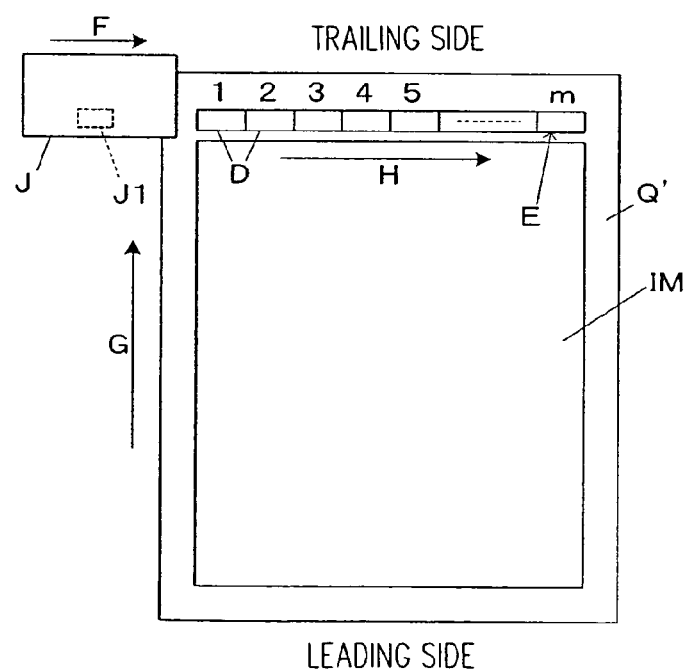
FIG. 11B illustrates an operational state where the print of FIG. 10B is scanned by the scanning section with the image capturing part located on the lower side of the Figure.

FIG. 9 is a flowchart illustrating the operation flow of the color print quality control system A of FIG. 1 according to another embodiment.

In this embodiment of the color print quality control system A, as illustrated in FIG. 9, for the quality control of the color print images IM1, IM2 of the double-sided color print Q, the double-sided color printing press 100 first prints the first color print image IM1 and the first color bar CB1 on the first side of the substrate P, and the second color print image IM2 and the second color bar CB2 on the second side of the substrate P, thus producing print Q (Step S1').

Then, in the color print quality evaluation apparatus 200, the scanning part 4 of the evaluation member 2 scans the first control patch groups PA1 of the print Q in the scanning direction X1 and the second control patch groups PA2 of the print Q in the scanning direction X2 so as to measure the densities of the first and second control patch groups PA1, PA2 (Step S2'). At this time, the recognition part 4a'' of the measuring division 4a of the scanning part 4 recognizes the colors of the control patches of the first and second control patch groups PA1, PA2 scanned by the scanning part 4 (Step S3'), and the detection means M2 of the control division 4b detects the alignment order of the patch's colors as the alignment information of the first and second control patch groups PA1, PA2 of the print Q measured by the spectrophotometer 4a' of the measuring division 4a, thereby detecting the color of at least the Nth (herein, the 2nd) control patch in the scanning directions X1, X2 of at least one of the control patch groups (Step S4').

Then, the recognition means M3 checks the color of at least the 2nd control patch in the scanning directions X1, X2 of the control patch groups detected by the detection means M2 against the colors (herein cyan (C) and magenta (M)) of the 2nd and 3rd control patches in the first alignment direction W1 and the direction opposite to the direction W1 of the first control patch groups previously stored in the memory means M1 (Step S5'), so that where a color is matched (Step S6'), the color bar of the control patch groups detected by the detection means M2 is recognized as the first color bar CB1 printed on the first side of the print Q (Step S7'), and where no color is matched (Step S6'), the color bar of the control patch groups detected by the detection means M2 is recognized as the second color bar CB2 printed on the second side of the print Q (Step S8').

Subsequent to the recognition of the fact that the color bar as detected is the first color bar CB1 printed on the first side of the print Q, the recognition means M3 compares the alignment order of the colors of the patches PA of the patch groups PA1 detected by the detection means M2 with the alignment order of the colors of the patches of the patch color groups PA1 previously stored in the memory means M1 (Step S9'), so that where they are matched to one another (Step S10'), the evaluation member 2 recognizes that the patch groups PA1 have been scanned in the order from the 1st to Mth patch groups so as to transmit the print quality information of the patches PA of the respective patch groups PA1 evaluated by the evaluation member 2 to the print control part CONT of the double-sided color printing press 100 in the order in which they have been scanned in the scanning direction X (Step S11'), and where they are not matched to one another, the evaluation member 2 recognizes that the patch groups PA1 have been scanned in the order from the Mth to 1st patch groups so as to transmit the print quality information of the patches PA of the respective patch groups PA1 evaluated by the evaluation member 2 to the print control part CONT of the double-sided color printing press 100 in the order reversed relative to the scanning direction X1 (Step S12'). Then, the ink control is made for the 1st to Mth ink fountain keys of the printing units 20a-20d of the first printing section 20X based on the density values of the first color bar CB1 in the order, in which these density values are transmitted from the evaluation member 2 (Step S13').

On the other hand, subsequent to the recognition of the fact that the color bar as detected is the second color bar CB2 printed on the second side of the print Q, the recognition means M3 compares the alignment order of the colors of the patches of the patch groups PA2 detected by the detection means M2 with the alignment order of the colors of the patches of the patch color groups PA2 previously stored in the memory means M1 (Step S14'), so that where they are matched to one another (Step S15'), the evaluation means 2 recognizes that the patch groups PA2 have been scanned in the order from the 1st to Mth patch groups so as to transmit the print quality information of the patches PA of the respective patch groups PA2 evaluated by the evaluation member 2 to the print control part CONT of the double-sided color printing press 100 in the order in which they have been scanned in the scanning direction X2 (Step S16'), and where they are not matched to one another, the evaluation member 2 recognizes that the patch groups PA2 have been scanned in the order from the Mth to 1st patch groups so as to transmit the print quality information of the patches PA of the respective patch groups PA2 evaluated by the evaluation member 2 to the print control part CONT of the double-sided color printing press 100 in the order reversed relative to the scanning direction X2 (Step S17'). Then, the ink control is made for the 1st to Mth ink fountain keys of the printing units 20e-20h of the second printing section 20Y based on the density values of the second color bar CB2 in the order, in which these density values are transmitted from the evaluation member 2 (Step S18').

According to the color print quality control system A of this embodiment, the detection means M3 of the color print quality evaluation apparatus 200 compares the alignment information of the patches of the patch groups PA1, PA2 acquired by the detection means M2 with the alignment information of the patches PA of the patch groups PA1, PA2 previously stored in the memory means M1, so that where they are matched to one another, the evaluation member 2 recognizes that the patch groups PA1, PA2 have been scanned in the order from the 1st to Mth patch groups so as to transmit the print quality information of the patches PA of the respective patch groups PA1, PA2 evaluated by the evaluation member 2 to the print control part CONT of the double-sided color printing press 100 in the order in which they have been scanned in the scanning directions X1, X2, and where they are not matched to one another, the evaluation member 2 recognizes that the patch groups PA1, PA2 have been scanned in the order from the Mth to 1st patch groups so as to transmit the print quality information of the patches PA of the respective patch groups PA1, PA2 evaluated by the evaluation member 2 to the print control part CONT of the double-sided color printing press 100 in the order reversed relative to the scanning directions X1, X2. That is, the adjustment of the amounts of inks set by the 1st to Mth ink fountain keys is made by the print control part CONT of the double-sided color printing press 100 based on the print quality information in the order in which these print quality information are transmitted from the evaluation member 2 of the color print quality evaluation apparatus 200, so that even if the print Q is turned 180° horizontally according to needs and circumstances, it is possible to omit the necessity to provide such as a 180-degree turn switch and hence omit a troublesome work such as pressing the switch by the operator for evaluation of the color print quality. Furthermore, with the above operational step, it is possible to recognize whether the color bar of the patch groups detected by the detection means M2 is printed on the first or second side of the print Q, and hence to facilitate the print quality control operation for the color print images IM1, IM2 on the respective sides of the double-sided color print Q, while preventing the operator's misoperation in executing the print quality control so as to limit the occurrence of defective prints.

According to the present invention as described above, it is possible to provide a method of recognizing color bars on double-sided color prints that is capable of facilitating the print quality control operation by the operator, as well as providing a color print quality control system and a color print quality evaluation apparatus that carry out this method.

More specifically, it is possible to provide a method of recognizing color bars on double-sided color prints that is capable of controlling the print quality such as density for all the basic colors of a color print image on each side of the double-sided color print, facilitating the print quality control operation of a color print image on each side of the double-sided color print, and preventing the operator's misoperation in executing the print quality control so as to limit the occurrence of defective prints, as well as providing a color print quality control system and a color print quality evaluation apparatus that carry out this method.

It is also possible to provide a color print quality control system that is capable of omitting the necessity to provide such as a 180-degree turn switch in the color print quality evaluation apparatus conventionally required for sending the information that a print has been turned 180°, and hence reducing the workload of the operator to press the switch or the like.

This specification is by no means intended to restrict the present invention to the preferred embodiments set forth therein. Various modifications to the method, system and apparatus, as described herein, may be made by those skilled in the art without departing from the spirit and scope of the present invention as defined in the appended claims.

What is claimed is:

1. A method of recognizing color bars on a double-sided color print printed by a double-sided color printing press with a first printing section and a second printing section, comprising:

printing on a first side of a substrate a first color print image composed of plural basic different colors and a first color bar for evaluation of the respective plural basic different colors of said first color print image by said first printing section, said first color bar being comprised of at least one first control patch group aligned in a first alignment direction, each of said at least one first control patch group being comprised of plural control patches of plural colors aligned in said first alignment direction respectively corresponding to said plural basic different colors;

printing on a second side of said substrate a second color image composed of said plural basic different colors and a second color bar for evaluation of the respective plural basic different colors of said second color print image by said second printing section, said second color bar being comprised of at least one second control patch group aligned in a second alignment direction different from said first alignment direction, each of said at least one second control patch group being comprised of plural control patches of plural colors aligned in said second alignment direction respectively corresponding to said plural basic different colors;

scanning at least one of said at least one first control patch group and said at least one second control patch group in a scanning direction identical to said alignment direction of the patches in said scanned at least one control patch group, thereby acquiring alignment information of said scanned at least one control patch group; and recognizing whether said first and second color bars each have been printed on said first side or second side of said double-sided color print.

2. A double-sided color print quality control system comprising a double-sided color printing press and a color print quality evaluation apparatus, said double-sided color printing press including:
- a first printing section that prints on a first side of a substrate a first color print image composed of plural basic different colors and a first color bar for evaluation of the respective plural basic different colors of said first color print image, said first color bar being comprised of at least one first control patch group aligned in a first alignment direction, each of said at least one first control patch group being comprised of plural control patches of plural colors aligned in said first alignment direction respectively corresponding to said plural basic different colors; and
- a second printing section that prints on a second side of said substrate a second color image composed of said plural basic different colors and a second color bar for evaluation of the respective plural basic different colors of said second color print image, said second color bar being comprised of at least one second control patch group aligned in a second alignment direction different from said first alignment direction, each of said at least one second control patch group being comprised of plural control patches of plural colors aligned in said second alignment direction respectively corresponding to said plural basic different colors;

said color print quality evaluation apparatus including:
- an evaluation member that scans said at least one first control patch group in a scanning direction identical to said first alignment direction, scans said at least one second control patch group in a scanning direction identical to said second alignment direction, thereby evaluating the print quality of said plural control patches of said at least one first control patch group and evaluating the print quality of said plural control patches of said at least one second control patch group;
- a detection means for acquiring alignment information of said plural control patches of at least one of said at least one first control patch group and said at least one second control patch group scanned by said evaluation member; and
- a recognition means for recognizing whether said first and second color bars each have been printed on said first side or second side of said double-sided color print based on said alignment information of said plural control patches acquired by said detection means.

3. The double-sided color print quality control system according to claim 2, wherein information recognized by said recognition means of said color print quality evaluation apparatus is automatically transmitted from said color print quality evaluation apparatus to said double-sided color printing press.

4. A color print quality evaluation apparatus for evaluation the print quality of plural control patches printed by a double-sided color printing press that includes a first printing section and a second printing section, in which a first color print image composed of plural basic different colors and a first color bar for evaluation of the respective plural basic different colors of said first color print image are printed by said first printing section on a first side of a substrate, said first color bar being comprised of at least one first control patch group aligned in a first alignment direction, each of said at least one first control patch group being comprised of plural control patches of plural colors aligned in said first alignment direction respectively corresponding to said plural basic different colors, and a second color image composed of said plural basic different colors and a second color bar for evaluation of the respective plural basic different colors of said second color print image are printed by a second printing section on a second side of said substrate, said second color bar being comprised of at least one second control patch group aligned in a second alignment direction different from said first alignment direction, each of said at least one second control patch group being comprised of plural control patches of plural colors aligned in said second alignment direction respectively corresponding to said plural basic different colors, said color print quality evaluation apparatus comprising:
- an evaluation member that scans said at least one first control patch group in a scanning direction identical to said first alignment direction, scans said at least one second control patch group in a scanning direction identical to said second alignment direction, thereby evaluating the print quality of said plural control patches of said at least one first control patch group and evaluating the print quality of said plural control patches of said at least one second control patch group;
- a detection means for acquiring alignment information of said plural control patches of at least one of said at least one first control patch group and said at least one second control patch group scanned by said evaluation member; and
- a recognition means for recognizing whether said first and second color bars each have been printed on said first side or second side of said double-sided color print based on said alignment information of said plural control patches acquired by said detection means.

5. The color print quality evaluation apparatus according to claim 4, wherein information recognized by said recognition means of said color print quality evaluation apparatus is automatically transmitted to said double-sided color printing press.

6. A color print quality control system comprising:
- a color printing press that includes a printing part that prints a color print image composed of plural basic different colors and a color bar for evaluation of the respective plural basic different colors on at least one side of each of substrates transferred in a given transfer direction by an ink fountain for said plural basic different colors, said ink fountain being equipped with 1st to Mth (M is an integer of 2 or larger) ink fountain keys aligned in an alignment direction crossing substantially at right angle to said transfer direction, said color bar being comprised of 1st to Mth control patch groups each comprised of control patches of plural colors aligned in said alignment direction respectively corresponding to said 1st to Mth ink fountain keys, and a print control part that adjusts the amounts of inks set by said 1st to Mth ink fountain keys based on print quality information of the control patches of said 1st to Mth patch groups; and
- a color print quality evaluation apparatus that includes a memory means for previously storing alignment information regarding said alignment direction of said plural control patches of said 1st to Mth control patch groups, an evaluation member that scans said 1st to Mth patch groups printed on said each of substrates by said color printing press and evaluates the print quality of the control patches of said scanned patch groups, a detection means for acquiring alignment information of the patches of at least one of said 1st to Mth patch groups scanned by said evaluation member, and a recognition means for recognizing said alignment information of the control patches in said at least one of said 1st to Mth patch groups;

wherein said recognition means of said color print quality evaluation apparatus compares said alignment information of the control patches acquired by said detection means with said alignment information of the control patches previously stored in said memory means, so that where they are matched to one another, said recognition means recognizes that said patch groups have been scanned in the order from the 1st to Mth patch groups by said evaluation member and transmits print quality information of the control patches of the respective patch groups evaluated by said evaluation member in the order in which said patch groups have been scanned in said scanning direction, and where they are not matched, said recognition means recognizes that said patch groups have been scanned in the order from the Mth to 1st patch groups by said evaluation member and transmits print quality information of the control patches of the respective patch groups evaluated by said evaluation member in the order reversed relative to said scanning direction; and wherein said print control part of said color printing press adjusts the amounts of inks set by said 1st to Mth ink fountain keys, based on said ink quality information in the order in which they are transmitted from said evaluation member of said color print quality evaluation apparatus.

7. The color print quality control system according to claim 6, wherein:

said color printing press is a double-sided color printing press;

said printing part of said double-sided color printing press comprises a first printing section that prints a first color print image composed of plural basic different colors and a first color bar for evaluation of the respective plural basic different colors on a first side of each of substrates transferred in a given transfer direction by a first ink fountain for said plural basic different colors, said first ink fountain being equipped with 1st to Mth (M is an integer of 2 or larger) ink fountain keys aligned in a first alignment direction crossing substantially at right angle to said transfer direction, said first color bar being comprised of 1st to Mth first control patch groups each comprised of control patches of plural colors respectively corresponding to said plural basic different colors, said control patches of said first control patch groups being aligned in said first alignment direction respectively corresponding to said 1st to Mth ink fountain keys, and a second printing section that prints a second color print image composed of said plural basic different colors and a second color bar for evaluation of the respective plural basic different colors on a second side of each of said substrates by a second ink fountain for said plural basic different colors, said second ink fountain being equipped with 1st to Mth (M is an integer of 2 or larger) ink fountain keys aligned in a second alignment direction crossing substantially at right angle to said transfer direction, said second color bar being comprised of 1st to Mth second control patch groups each comprised of control patches of plural colors respectively corresponding to said plural basic different colors, said control patches of said second control patch groups being aligned in said second alignment direction respectively corresponding to said 1st to Mth ink fountain keys;

said first and second color bars are respectively printed so as not to have a common color between at least the Nth (N is an integer of 1 or larger) control patch in said first alignment direction and the direction opposite to said first alignment direction of each of said 1st to Mth first control patch groups and at least the Nth control patch in said second alignment direction and the direction opposite to said second alignment direction of each of said 1st to Mth second control patch groups;

said print control part adjusts the amounts of inks set by said 1st to Mth ink fountain keys of said first printing section based on the print quality information of the control patches of said 1st to Mth control patch groups on the first side of the substrate printed by said first printing section and adjusts the amounts of inks set by said 1st to Mth ink fountain keys of said second printing section based on the print quality information of the control patches of said 1st to Mth control patch groups on the second side of the substrate printed by said second printing section;

said memory means of said color print quality evaluation apparatus previously stores the color of at least one of said at least Nth control patch in said first alignment direction and the direction opposite to said first alignment direction of each of said 1st to Mth first control patch groups printed on the first side of the substrate and said at least Nth control patch in said second alignment direction and the direction opposite to said second alignment direction of each of said 1st to Mth second control patch groups printed on the second side of the substrate;

said evaluation member includes a measuring division capable of recognizing colors of the control patches of said scanned control patch groups;

said detection means detects the color of at least the Nth control patch in said scanning direction of at least one of said first and second patch groups on the substrate with said first and second color bars printed thereon by said first and second printing sections so as not to have said common color, thus acquiring the alignment information of the control patches in said detected control patch group; and said recognition means checks the color of said at least the Nth control patch detected by said detection means against the colors of the control patches previously stored in said memory means, thereby recognizing whether the color bar of the patch groups detected by said detection means has been printed on the first or second side of the substrate.

* * * * *